US012784261B2

(12) United States Patent
Kollhof et al.

(10) Patent No.: US 12,784,261 B2
(45) Date of Patent: Nov. 3, 2026

(54) SYSTEM AND METHOD OF SELECTING A COMPLEMENTARY IMAGE FROM A PLURALITY OF IMAGES FOR 3D GEOMETRY EXTRACTION

(71) Applicant: Nearmap Australia Pty Ltd, Barangaroo (AU)

(72) Inventors: Jan Klas Kollhof, Coogee (AU); Nicholas Anthony Manks, Randwick (AU); Wayne David Petzler, Dundas Valley (AU); Natasha Jane Ridley, Epping (AU)

(73) Assignee: Nearmap Australia Pty Ltd, Barangaroo (AU)

( * ) Notice: Subject to any disclaimer, the term of this patent is extended or adjusted under 35 U.S.C. 154(b) by 551 days.

(21) Appl. No.: 17/198,168

(22) Filed: Mar. 10, 2021

(65) Prior Publication Data

US 2021/0201522 A1 Jul. 1, 2021

Related U.S. Application Data

(63) Continuation of application No. PCT/AU2019/000110, filed on Sep. 17, 2019.

(Continued)

(51) Int. Cl.

*G06T 7/73* (2017.01)
*G06F 3/0482* (2013.01)

(Continued)

(52) U.S. Cl.

CPC .............. *G06T 7/73* (2017.01); *G06F 3/0482* (2013.01); *G06T 7/0002* (2013.01); *G06T 7/60* (2013.01);

(Continued)

(58) Field of Classification Search

CPC ........... G06T 7/73; G06T 7/0002; G06T 7/60; G06T 2200/24; G06T 2207/10032;

(Continued)

(56) References Cited

U.S. PATENT DOCUMENTS 6,385,541 B1 5/2002 Blumberg et al.
7,305,983 B1 12/2007 Meder et al.

(Continued)

FOREIGN PATENT DOCUMENTS

CN 104039229 A 9/2014 .............. A61B 6/00
WO WO2000002980 A2 5/2000

(Continued)

OTHER PUBLICATIONS

International Search Report and Written Opinion, International Application PCT/AU2019/000110, Mailed Dec. 3, 2019.

(Continued)

*Primary Examiner* — Cesar B Paula
*Assistant Examiner* — John M Heffington
(74) *Attorney, Agent, or Firm* — Dov Rosenfeld; Inventek

(57) ABSTRACT

A digital processing system for, a method, implemented on a digital processing system of, and a non transitory machine readable medium containing instructions that when executed implement the method of: automatically selecting one or more complementary images from a set of provided images for use with triangulation and determination of 3D properties of a user-selected point or geometric feature of interest, such as information on the slope (also called the pitch) and one or more dimensions of a roof of a building. The one or more complementary images are selected automatically by using an optimality criterion, also called a complementarity criterion.

39 Claims, 9 Drawing Sheets

Related U.S. Application Data

(60) Provisional application No. 62/732,768, filed on Sep. 18, 2018.

(51) Int. Cl.

| | |
|---|---|
| ***G06T 7/00*** | (2017.01) |
| ***G06T 7/60*** | (2017.01) |
| ***G06V 10/75*** | (2022.01) |
| ***G06V 20/10*** | (2022.01) |
| ***G06V 20/64*** | (2022.01) |
| *G01C 11/04* | (2006.01) |
| *G01C 11/06* | (2006.01) |
| *G01C 11/34* | (2006.01) |
| *G06F 18/40* | (2023.01) |
| *G06T 7/62* | (2017.01) |

(52) U.S. Cl.

CPC .......... *G06V 10/759* (2022.01); *G06V 20/176* (2022.01); *G06V 20/647* (2022.01); *G01C 11/04* (2013.01); *G01C 11/06* (2013.01); *G01C 11/34* (2013.01); *G06F 18/41* (2023.01); *G06T 7/001* (2013.01); *G06T 7/62* (2017.01); *G06T 2200/24* (2013.01); *G06T 2207/10032* (2013.01); *G06T 2207/20092* (2013.01); *G06T 2207/20104* (2013.01); *G06T 2207/30132* (2013.01); *G06T 2207/30184* (2013.01); *G06T 2207/30244* (2013.01); *G06V 20/64* (2022.01); *G06V 2201/12* (2022.01)

(58) Field of Classification Search

CPC . G06T 2207/20092; G06T 2207/30184; G06T 7/62; G06T 7/001; G06T 2207/20104; G06T 2207/30132; G06T 2207/30244; G06F 3/0482; G06F 18/41; G06V 10/759; G06V 20/176; G06V 20/647; G06V 20/64; G06V 2201/12; G01C 11/06; G01C 11/34; G01C 11/04

See application file for complete search history.

(56) References Cited

U.S. PATENT DOCUMENTS

| | | | | |
|---|---|---|---|---|
| 7,500,391 | B2 | 3/2009 | Woro | |
| 7,728,833 | B2 | 6/2010 | Verma et al. | |
| 7,752,018 | B2 | 7/2010 | Rahmes et al. | |
| 8,078,436 | B2 | 12/2011 | Pershing et al. | |
| 8,131,514 | B2 | 3/2012 | Royan et al. | |
| 8,170,840 | B2 | 5/2012 | Pershing | |
| 8,209,152 | B2 | 6/2012 | Pershing | |
| 8,401,222 | B2 | 3/2013 | Thornberry et al. | |
| 8,422,825 | B1 * | 4/2013 | Neophytou | G06F 3/14 382/294 |
| 8,515,125 | B2 | 8/2013 | Thornberry et al. | |
| 8,542,880 | B2 | 9/2013 | Thornberry et al. | |
| 8,593,518 | B2 | 11/2013 | Schultz et al. | |
| 8,670,961 | B2 | 3/2014 | Pershing et al. | |
| 8,731,234 | B1 | 5/2014 | Ciarcia et al. | |
| 8,818,770 | B2 | 8/2014 | Pershing | |
| 8,825,454 | B2 | 9/2014 | Pershing | |
| 8,977,520 | B2 | 3/2015 | Stephens et al. | |
| 8,983,806 | B2 | 3/2015 | Labrie et al. | |
| 8,995,757 | B1 | 3/2015 | Cíarcía et al. | |
| 9,070,018 | B1 | 6/2015 | Cíarcía et al. | |
| 9,129,376 | B2 | 9/2015 | Pershing | |
| 9,135,737 | B2 | 9/2015 | Pershing | |
| 9,141,880 | B2 | 9/2015 | Ciarcia | |
| 9,182,657 | B2 | 11/2015 | Schultz et al. | |
| 9,183,538 | B2 | 11/2015 | Thornberry et al. | |
| 9,244,589 | B2 | 1/2016 | Thornberry et al. | |
| 9,329,749 | B2 | 5/2016 | Thornberry et al. | |
| 9,430,871 | B2 | 8/2016 | Neophytou et al. | |
| 9,437,029 | B2 | 9/2016 | Schultz et al. | |
| 9,501,700 | B2 | 11/2016 | Loveland et al. | |
| 9,514,568 | B2 | 12/2016 | Pershing et al. | |
| 9,542,417 | B2 | 1/2017 | Hieronymus et al. | |
| 9,679,227 | B2 | 6/2017 | Taylor et al. | |
| 9,805,489 | B2 | 10/2017 | Schultz et al. | |
| 9,811,922 | B2 | 11/2017 | Schultz et al. | |
| 10,671,648 | B2 | 6/2020 | Barrow et al. | |
| 2009/0132436 | A1 | 5/2009 | Pershing et al. | |
| 2009/0234692 | A1 | 9/2009 | Powell et al. | |
| 2010/0110074 | A1 | 5/2010 | Pershing | 345/423 |
| 2010/0114537 | A1 | 5/2010 | Pershing | |
| 2010/0179787 | A2 | 7/2010 | Pershing et al. | |
| 2010/0296693 | A1 | 11/2010 | Thornberry et al. | |
| 2011/0064312 | A1 | 3/2011 | Janky et al. | |
| 2012/0170797 | A1 | 7/2012 | Pershing et al. | |
| 2012/0191424 | A1 | 7/2012 | Pershing | |
| 2012/0209782 | A1 | 8/2012 | Pershing et al. | |
| 2012/0223965 | A1 | 9/2012 | Pershing | |
| 2013/0311240 | A1 | 11/2013 | Pershing et al. | |
| 2014/0104280 | A1 | 4/2014 | Ofstad et al. | |
| 2014/0177945 | A1 | 6/2014 | Pershing et al. | |
| 2014/0369595 | A1 * | 12/2014 | Pavlidis | G06V 20/176 382/154 |
| 2014/0371578 | A1 * | 12/2014 | Auvray | A61B 6/503 600/424 |
| 2015/0306824 | A1 * | 10/2015 | Flores Mangas | G06F 30/00 700/98 |
| 2016/0063654 | A1 | 3/2016 | Thornberry et al. | |
| 2016/0134851 | A1 * | 5/2016 | Grundhofer | G06T 3/0093 348/745 |
| 2017/0076438 | A1 * | 3/2017 | Kottenstette | G06V 20/176 |
| 2017/0220887 | A1 | 8/2017 | Fathi et al. | |

FOREIGN PATENT DOCUMENTS

| | | | |
|---|---|---|---|
| WO | WO2009046459 | A2 | 4/2009 |
| WO | WO2009114341 | A | 9/2009 |
| WO | WO2009114341 | A3 | 9/2009 |
| WO | WO2015017855 | A1 | 2/2015 |

OTHER PUBLICATIONS

Ildikó Süveg: Reconstruction of 3D Building Models from Aerial Images and Maps, Issue 90 of ASCI dissertation series, vol. 53 of Publications on geodesy, ISSN 0165-1706, Netherlands Geodetic Commission, 2003.

Samadzadegan, Farhad & Ramzi, Pouria & Schenk, Anton."Aerial triangulation of digital aerial imagery using hybrid features," The International Archives of the Photogrammetry, Remote Sensing and Spatial Information Sciences. vol. XXXVII. Part B1. Beijing 2008.

Thomas Kersten, Silvio Haering, "efficient automated digital aerial triangulation through customisation of a commercial photogrammetric system," Int. Archives of Photogrammetry & Remote Sensing, ISPRS Workshop, Haifa, Israel, Sep. 9-11, 1997, vol. 32, Part 3-2W3, pp. 72-79.

Robert T. Collins, Christopher O. Jaynes, Yong-Qing Cheng, Xiaoguang Wang, Frank Stolle, Edward M. Riseman, and Allen R. Hanson: "The Ascender System: Automated Site Modeling from Multiple Aerial Images," Computer Vision and Image Understanding vol. 72, No. 2, November, pp. 143-162, 1998 Article No. IV980729.

Collins, Robert & Hanson, Allen & Riseman, Edward & Schultz, Howard. (1995). Automatic Extraction of Buildings and Terrain from Aerial Images. 10.1007/978-3-0348-9242-1_16. Available Feb. 15, 2021 at https://www.researchgate.net/publication/2683283_Automatic_Extraction_of_Buildings_and_Terrain_from_Aerial_Images.

Richard I Hartley and Peter Sturm, Triangulation, CVIU—Computer Vision and Image Understanding, vol. 68, No. 2, pp. 146-157, Nov. 1997.

Samuel Hornus. A review of polyhedral intersection detection and new techniques. [Research Report] RR-8730, Inria Nancy—Grand Est (Villers-lès-Nancy, France). 2015, pp. 35. <hal-01157239v1>.

Yuan Hsieh, SiteCity: a semi-automated site modelling system, Proceedings CVPR IEEE Computer Society Conference on Computer Vision and Pattern Recognition, Jun. 18-20, 1996.

(56) References Cited

OTHER PUBLICATIONS

Collins, Robert & Cheng, Yong-Qing & Jaynes, Chris & Stolle, Frank & Wang, Xiaoguang & Hanson, Allen & Riseman, Edward. (1995). Site Model Acquisition and Extension from Aerial Images . . . Computer Vision, IEEE International Conference on. 888-893. 10.1109/ICCV.1995.466842.

L. López, S. Laguela, Inmaculada Picon, D. González-Aguilera: Automatic Analysis and Classification of the Roof Surfaces for the Installation of Solar Panels Using a Multi-Data Source and Multi-Sensor Aerial Platform, The International Archives of the Photogrammetry, Remote Sensing and Spatial Information Sciences, vol. XL-5/W4, 2015.

A. Wiedemann, J. Moré : Orientation strategies for aerial oblique images, International Archives of the Photogrammetry, Remote Sensing and Spatial Information Sciences, vol. XXXIX-B1, 2012.

Kunal Khanna : 3D Rooftop Detection And Modeling Using Orthographic Aerial Images, M.S. Thesis, Arizona State University, May 2013, retrieved Sep. 3, 2018 at https://repository.asu.edu/attachments/110462/content/Khanna_asu_0010N_12858.pdf.

Peter Krzystek, Tobias Heuchel, Uwe Hirt and Frank Petran: A New Concept for Automatic Digital Aerial Triangulation, in pp. 215-223, ‘Photogrammetric Week ’95’, D. Fritsch & D. Hobbie, Eds., Wichmann Verlag, Heidelberg, 1995 retrieved Sep. 3, 2018 at http://www.ifp.uni-stuttgart.de/publications/phowo95/krzystek.pdf.

Marc Levoy: A Hybrid Ray Tracer for Rendering Polygon and Volume Data, TR89-035 Oct. 1989, The University of North Carolina at Chapel Hill Department of Computer Science CB#3175, Sitterson Hall Chapel Hill, NC 27599-3175, retrieved Sep. 11, 2018 at http://www.cs.unc.edu/techreports/89-035.pdf.

Luis López-Fernandez, Susana Lagüela, Inmaculada Picón and Diego González-Aguilera: Large Scale Automatic Analysis and Classification of Roof Surfaces for the Installation of Solar Panels Using a Multi-Sensor Aerial Platform, Remote Sens. 2015, 7, 11226-11248.

Sanjay Noronha and Ramakant Nevatia, Detection and Modeling of Buildings from Multiple Aerial Images, IEEE Transactions on Pattern Analysis and Machine Intelligence, vol. 23, No. 5, May 2001 pp. 501-518.

Xuebin Qin, Martin Jagersand, Xiucheng Yang and Jun Wang, Building Facade Recognition from Aerial Images using Delaunay Triangulation Induced Feature Perceptual Grouping, Proc. 2016 23rd International Conference on Pattern Recognition (ICPR) Cancún Center, Cancún, Mexico, Dec. 4-8, 2016, pp. 3368-3373.

Godfried T. Toussaint, A Simple Linear Algorithm for Intersecting Convex Polygons, The Visual Computer 1, 118-123 (1985). https://doi.org/10.1007/BF01898355.

Xiong, Zhen (2009). Technical Development for Automatic Aerial Triangulation of High Resolution Satellite Imagery. Ph.D. dissertation, Department of Geodesy and Geomatics Engineering, Technical Report No. 268, University of New Brunswick, Fredericton, New Brunswick, Canada.

Y. Zamani, H. Shirzad and S. Kasaei, “Similarity measures for intersection of camera view frustums,” 2017 10th Iranian Conference on Machine Vision and Image Processing (MVIP), Isfahan, 2017, pp. 171-175, doi: 10.1109/IranianMVIP.2017.8342343.

Extended European Search Report on EP Application No. 19863067.5, mailed Jun. 8, 2022.

Michael Goesele et al: “Multi-View Stereo for Community Photo Collections”, ICCV 2007. IEEE 11th International Conference on Computer Vision, 2007, Oct. 14, 2007.

Facciolo, Gabriele et al: Automatic 3D Reconstruction from Multi-date Satellite Images, 2017 IEEE Conference on Computer Vision and Pattern Recognition Workshops (CVPRW) IEEE.

Hosseininaveh Aii et al: “Automatic Image Selection in Photogrammetric Multi-view 13-15 Stereo Methods”, The 13th International Symposium on Virtual Reality, Archaeology and Cultural Heritage VAST The Eurographics Association, 2012.

Robert T. Collins, Christopher O. Jaynes, Yong-Qing Cheng, Xiaoguang Wang, Frank Stolle, Edward M. Riseman, and Allen R. Hanson: “The Ascender System: Automated Site Modeling from Multiple Aerial Images,” Computer Vision and Image Understanding vol. 72, No. 2.

Written Opinon on Singapore Patent Application 11202101867Q, Intellectual Property Office of Singapore, dated Dec. 19, 2022.

Rejection of Japanee Patent Application 2021-538866 dated Jul. 18, 2023 and translation thereof.

Office Action dated May 31, 2024 on counterpart Chinese Application No. 201980061047.X, and translation thereof.

Examination Report from IP Australia dated Jul. 2, 2024 on counterpart Australian application No. 2019344408.

AN Examination Report from the EPO dated Jul. 28, 2024 on counterpart application No. 19863067.5.

Office action on counterpart Chinese Application No. 201980061047.X, mailed Sep. 25, 2024, and translation thereof.

Examination Report from the EPO dated Jan. 26, 2026 on counterpart application No. 19863067.5.

* cited by examiner

```
// Photo sorting criteria:
// -------------------------------------------------------
// * Position: distance fron the desired position to meters
// * Heading: deviation fron given heading in degrees
//  * Pitch: deviation from given pitch in degrees
//
// Photos are given a score for each criteria.
// Scores can be positive or negative, sometimes the goal is to have more
// deviation, sometimes less.
// Combined score for each photo determines sort order {higher scores first).

// eslist-disable-next-line  max-params
const photoScore = (photo, center, heading, pitch, weights =>  {
   const positionScore = getMetersFromCenter(photo, center) * weights.position;
   const headingScore = degreesFromHeading (photo, heading) * weights.heading;
   const pitchScore = angledifference(cameraPitch(photo), pitch) * weights.pitch;

return positlonScore + headingScore + pitchScore;
};

const bestPtoto = (center, heading, pitch, weights) => (photoA, photoB) => {
   const scoreA = photoScore(photoA, center, heading, pitch, weights);
   const scoreB = photoScore(photoB, center, heading, pitch, weights);

   return scoreB - scoreA;
};

export const SortByBestForThumbnailList = (photos, center, heading) => {
   const weights = {
     position: -1 / 100, // 1 point for every 100 meters from perfectly centered
     heading: -1 / 22.5, // -1 point for every 22.5 degrees of heading deviation
     pitch: 1 / 45 // +1 point for every 45 degrees of pitch deviation
   };

   const pitch  = 90; // camera pointing down, more deviation from this is better

   // using Array.from() to prevent modifying the original array
   return Array.from(photos).sort(bestPhoto(center, heading, pitch, weights));
};

export const sortByBestForRefinement = (photos, center, heading, pitch) => {
   const weights = {
     position: -1 / 200, // 1 point for every 200 meters from perfectly centered
     heading: -1 / 22.5, // -1 point for every 22.5 degrees of heading deviation
     pitch: 1 / 22.5 // +1 point for every 22.5 degrees of pitch deviation
   };

   // using Array.from() to prevent modifying the original array
   return Array.from(photos).sort{
     bestPhoto(center, heading, pitch, weights)
   };
};
```

FIG. 8

Corrected drawn line with calculated length and slope thereof 1305

Results of pitch calculations 1307

Pitch tool 1309

1303 Optimal image

SYSTEM AND METHOD OF SELECTING A COMPLEMENTARY IMAGE FROM A PLURALITY OF IMAGES FOR 3D GEOMETRY EXTRACTION

RELATED APPLICATIONS

The present application is a continuation of international application PCT/AU2019/000110 with filing date of 17 Sep. 2019, the contents of which are incorporated herein by reference. Application PCT/AU2019/000110 claims benefit of priority to U.S. Prov. Pat. Appl. No. 62/732,768 filed 18 Sep. 2018, the contents of which are incorporated herein by reference.

FIELD OF INVENTION

This invention relates to systems and methods for selecting and prioritizing a set of images for use for extracting 3D geometry, wherein the geometry extracting uses a plurality of images with different perspectives of a point or feature.

BACKGROUND

Extracting 3D geometry from a plurality of aerial images, taken from different camera angles and/or camera locations, is a practical problem of interest in many applications. One such application, for example, is the building and construction industry, for example to provide information to roofing and solar contractors. Builders, architects, and engineers may need to gain an understanding of the roof geometry in 3 dimensions.

There has long been a need for using computer technology to carry out this practical application, and products for carrying this out are available. It is known, for example, to use multi-view imagery such as that captured from a camera system on an aircraft, a drone, or a mobile device together with computer technology for this application. Triangulation methods to determine location in 3D from a plurality of aerial images are known. For example, it is known to determine a particular point in 3D space using aerial images taken of an object or point on the ground from different locations and/or angles.

As used herein, complementary images are images (a) in which a particular point or geometric feature of interest is visible, and (b) that yield a solution to triangulation, thus enabling extracting geometry. It is known, for example, for a human to identify a point or region in each of the complementary images, e.g., using a computer having a user interface displaying the images. A 3D point triangulation technique can then yield the 3D coordinates of a point in 3D space.

If a plurality of such 3D point coordinates are derived using a triangulation technique, and these point coordinates correspond to vertices of a planar structure, then geometry information of that structure may be inferred, including lengths, slopes, areas of regions, and so forth.

It may be the case that only some but not all of a plurality of available aerial images are complementary for a particular triangulation task. It further may be that not all of the images are as effective as a complementary image to a selected image. There thus is a need in the art for a system ad method that defines one or more measures of suitability of an image to be complementary to a selected ("initial") image and to use such one or more measures to automatically determine the best complementary images image to the initial image among the plurality of available aerial images.

BRIEF DESCRIPTION OF THE DRAWINGS

The following drawings and the associated descriptions are provided to illustrate embodiments of the present disclosure and do not limit the scope of the invention; the scope is defined by the claims. Aspects of and advantages of this disclosure will become more readily appreciated as these aspects and advantages become better understood by reference to the following detailed description, when taken in conjunction with the accompanying drawings, wherein:

FIG. 8 shows example code implementing at least part of an embodiment referred to as Embodiment B herein.

DETAILED DESCRIPTION OF EXAMPLE EMBODIMENTS

Overview

Figure 1:
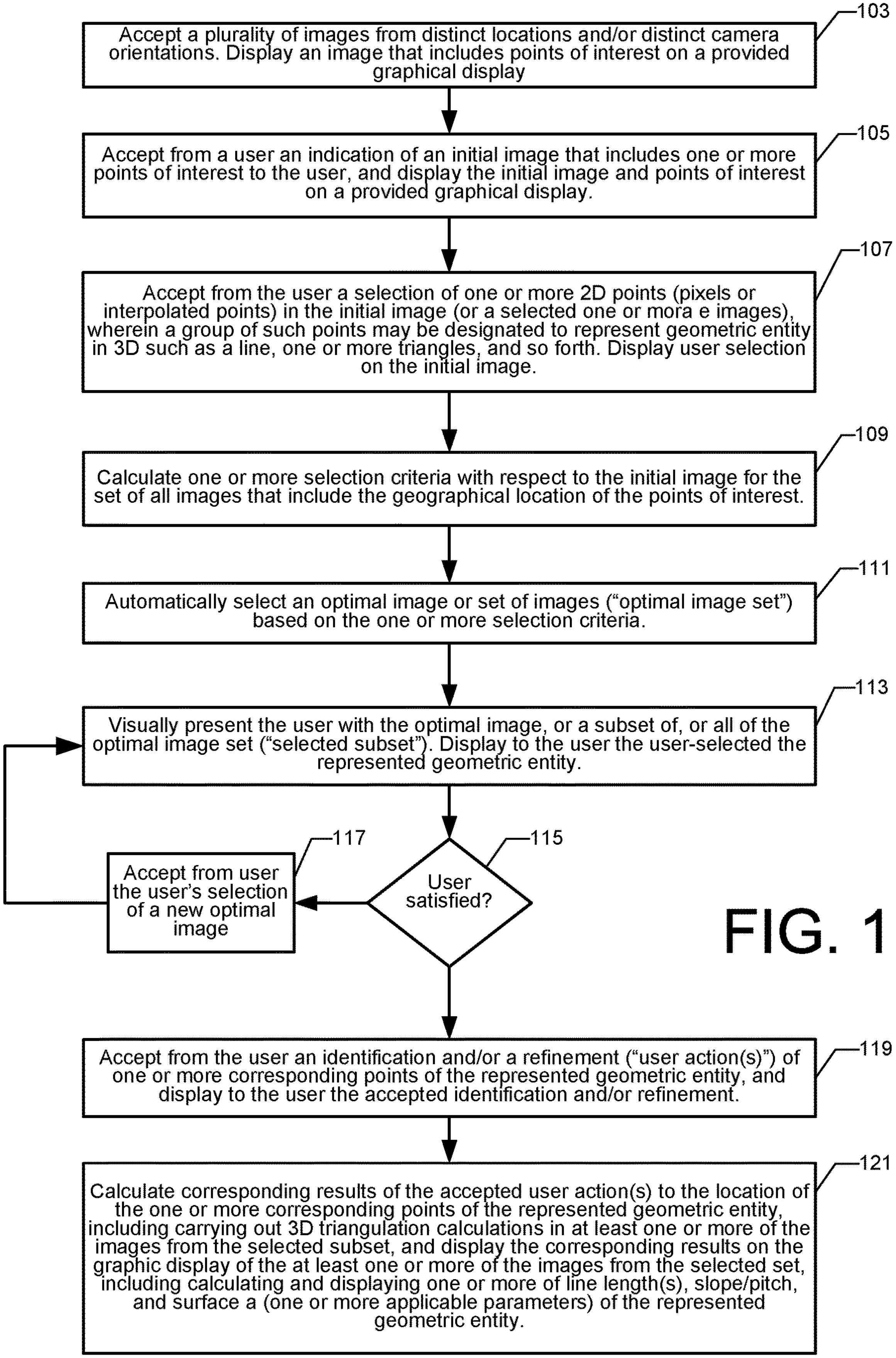
FIG. 1 shows a simplified flowchart of a process involving a user interacting with a digital processing system for determining one or more geometric features on an initial image, including the system carrying out a method of automatically selecting a "best" complementary image to the initial image from a provided set of images according to one or more selection criteria. The process includes providing for a user a user interface on which the user may modify a feature determined using one or more selected complementary images in order to repeat the automatically selecting a "best" complementary image until a satisfactory result is obtained.

Described herein is a system for and method of automatically selecting one or more complementary images from a set of provided images for use with triangulation and determination of 3D properties of a user-selected point or geometric feature of interest, such as information on the slope (also called the pitch) and one or more dimensions of a roof of a building. The one or more complementary images are selected automatically by the method using an optimality criterion, also called a complementarity criterion herein.

Particular embodiments include a method, implemented by a digital processing system, for selecting complementary images from a plurality of images captured from distinct views and/or locations, each respective image captured from a respective camera having respective camera properties. The method comprising:

- accepting the plurality of images, including, for each accepted image, parameters related to the accepted image and to properties of the camera that captured the accepted image;
- accepting input from a user to select one of the accepted images to be an initial image;
- accepting input from the user indicating one or more geometric features of interest; and
- automatically selecting from the accepted plurality of images and using an optimality criterion an optimal image that is complementary to the initial image for the purpose of determining one or more 3D properties of the indicated one or more geometric features.

In some embodiments of the method. the one or more geometric features of interest in the initial image include one of the set of features consisting of a point, a line, and a surface.

In some particular embodiments of any of the above described method embodiments, the automatically selecting includes automatically selecting from the accepted plurality of images one or more additional images forming with the optimal image an optima set, each image of the optimal set being complementary to the initial image for determining 3D properties of the indicated one or more geometric features. Some versions further include ranking some or all of the images in the optimal set according to the optimality criterion, the ranking according to suitability for use as a complementary image to the initial image, with the highest ranked image being the optimal image.

Some versions embodiments of any of the above described method embodiments further comprise:

displaying to the user the optimal image, with the one or more geometric features of interest displayed.

Some of said some versions further comprise:

- accepting from the user a correction of at least one of the one or more displayed geometric features of interest, such that the location of the correction can be used for determining one or more geometric properties of the geometric feature or features of interest; and
- determining one or more 3D properties of the indicated geometric feature or features.

In some of the above described method embodiments and versions thereof, the accepting input from a user to select; the accepting input from the user an indication, and the accepting from the user a correction are all via a graphic user interface that displays images.

In some particular versions of the any of the above method embodiments and versions thereof, the one or more 3D properties include the slope of a roof of a building.

Some versions of the any of the above method embodiments and versions that include forming the optimal set, further comprise:

- accepting from the user a selection of one of the other images from the optimal set to be a new optimal image;
- displaying to the user the new optimal image, with the one or more geometric features of interest displayed on the new optimal image;
- accepting from the user a correction of at least one of the one or more displayed geometric features of interest on the new optimal image, such that the location on the new optimal image of the correction can be used for determining one or more geometric properties of the geometric feature or features of interest; and
- determining one or more 3D properties of the indicated geometric feature or features.

Some embodiments of any of the above described method embodiments further comprise:

- accepting an indication from the user of one or more new geometric features of interest, which may be the same geometric features earlier selected in the current initial image, wherein the optimal image after the accepting the indication of one or more new geometric features of interest becomes a new initial image;
- automatically selecting from the accepted plurality of images and using the optimality criterion a new optimal image that is complementary to the new initial image for the purpose of deter; and
- displaying to the user the new optimal image, with the one or more additional geometric features of interest displayed.

Furthermore, in some versions of the embodiments described in the above paragraph, the automatically selecting includes automatically selecting from the accepted plurality of images one or more additional images forming with the optimal image an optima set, each image of the optimal set being complementary to the new initial image for determining 3D properties of the indicated one or more geometric features. Some such versions further comprise ranking some or all of the images in the optimal set according to the optimality criterion, the ranking according to suitability for use as a complementary image to the initial image, with the highest ranked image being the optimal image.

Some embodiments of the above described method embodiments that include accepting the indication of the one or more new geometric features of interest further comprise:

- accepting from the user a new correction of at least one of the displayed one or more new geometric features of interest, such that the location of the new correction can be used for determining one or more geometric properties of the new geometric feature or features of interest; and
- determining one or more 3D properties of the indicated new geometric feature or features.

In some embodiments of the above described method embodiments, the automatically selecting uses as the optimality criterion an overall measure of complementarity of the initial image or new initial image and the geometric feature or features, or new geometric feature or features to a potential optimal image, the overall measure of complementarity including one or more specific measures and corresponding selection criteria. The one or more specific measures include one or more of a measure of the intersection between frustums, a measure coverage, a measure of the intersection between the frustum and an estimated extrusion or arbitrary volume, a measure of angular deviation, and a measure of resolution.

Particular embodiments include a non-transitory machine-readable medium comprising instructions that when executed on one or more digital processors of a digital processing systems cause carrying out a method as recited in any one of the above describe method embodiments.

Particular embodiments include a digital processing system comprising one or more processors and a storage subsystem, wherein the storage subsystem includes a non-transitory machine-readable medium comprising instructions that when executed on one or more digital processors of a digital processing systems cause carrying out a method as recited in any one of the above describe method embodiments.

Particular embodiments include a digital processing system comprising:

- an input port configured to accept a plurality of images captured from distinct views and/or locations, each respective image having been captured from a respective camera, the accepting including accepting, for each respective accepted image, respective parameters related to the respective accepted image and to properties (collectively the "camera model") of the respective camera that captured the respective accepted image;
- a graphical user interface, e.g., in a user terminal having a display screen and input subsystem, the graphical user interface able to display an image displayed and having an input system for a user to accept input and to interact with a displayed image;
- a digital image processing system coupled to the user terminal, the digital image processing system including one or more digital processors, and a storage subsystem that includes instructions that when executed by the digital processing system, cause the digital processing system to carry out a method of selecting one or more complementary images from a plurality of images accepted via the input port, the method comprising:
  - accepting via the input port the plurality of images and parameters;
  - accepting e.g., via the graphical user interface input from a user to select one of the accepted images to be an initial image;
  - accepting e.g., via the graphical user interface input from the user indicating one or more geometric features of interest; and
  - automatically selecting from the accepted plurality of images and using an optimality criterion an optimal image that is complementary to the initial image for the purpose of determining one or more 3D properties of the indicated one or more geometric features.

In some particular embodiments of the digital processing system, the one or more geometric features of interest in the initial image include one of the set of features consisting of a point, a line, and a surface.

In some particular embodiments of the digital processing system, the automatically selecting includes automatically selecting from the accepted plurality of images one or more additional images forming with the optimal image an optima set, each image of the optimal set being complementary to the initial image for determining 3D properties of the indicated one or more geometric features.

In some particular embodiments of the digital processing system that include forming the optimal set, the method further comprises ranking some or all of the images in the optimal set according to the optimality criterion, the ranking according to suitability for use as a complementary image to the initial image, with the highest ranked image being the optimal image.

Some versions of the digital processing system as recited above, the method further comprises displaying to the user e.g., on the graphical user interface the optimal image, with the one or more geometric features of interest also displayed.

In one of said some versions, the method further comprises: accepting e.g., via the graphical user interface from the user a correction of at least one of the one or more displayed geometric features of interest, such that the location of the correction can be used for determining one or more geometric properties of the geometric feature or features of interest; and determining one or more 3D properties of the indicated geometric feature or features.

In some versions of the digital processing system as recited above, the one or more 3D properties include the slope of a roof of a building.

In some versions of the digital processing system that include forming the optimal set, the method further comprises: accepting from the user e.g., via the graphical user interface a selection of one of the other images from the optimal set to be a new optimal image, and displaying to the user e.g., on the graphical user interface the new optimal image, with the one or more geometric features of interest displayed on the new optimal image.

In some of said some versions that include forming the optimal set, the method further comprises: accepting from the user e.g., via the graphical user interface a correction of at least one of the one or more displayed geometric features of interest on the new optimal image, such that the location on the new optimal image of the correction can be used for determining one or more geometric properties of the geometric feature or features of interest; and determining one or more 3D properties of the geometric feature or features.

In some versions of the digital processing system that include forming the optimal set, the method further comprises:

- accepting from the user an indication of one or more new geometric features of interest, which may be the same geometric features earlier selected in the current initial image, wherein the optimal image after the accepting the indication of one or more new geometric features of interest becomes a new initial image;
- automatically selecting from the accepted plurality of images and using the optimality criterion a new optimal image that is complementary to the new initial image for the purpose of deter; and
- displaying to the user the new optimal image, with the one or more additional geometric features of interest displayed.

In some versions of the digital processing system described in the above paragraph, the automatically selecting includes automatically selecting from the accepted plurality of images one or more additional images forming with the optimal image an optima set, each image of the optimal set being complementary to the new initial image for determining 3D properties of the indicated one or more geometric features. In some of said some versions the method further comprises ranking some or all of the images in the optimal set according to the optimality criterion, the ranking according to suitability for use as a complementary image to the initial image, with the highest ranked image being the optimal image.

In some versions of the digital processing system as described in any one of the above two paragraphs, the method further comprises: accepting from the user a new correction of at least one of the displayed one or more new geometric features of interest, such that the location of the new correction can be used for determining one or more geometric properties of the new geometric feature or features of interest; and determining one or more 3D properties of the indicated new geometric feature or features.

In some embodiments of the above described digital image processing system embodiments, the automatically selecting uses as the optimality criterion an overall measure of complementarity of the initial image or new initial image and the geometric feature or features, or new geometric feature or features to a potential optimal image, the overall measure of complementarity including one or more specific measures and corresponding selection criteria. The one or more specific measures include one or more of a measure of the intersection between frustums, a measure coverage, a measure of the intersection between the frustum and an estimated extrusion or arbitrary volume, a measure of angular deviation, and a measure of resolution.

Particular embodiments include a digital processing system comprising:

- means for accepting a plurality of images captured from distinct views and/or locations, each respective image having been captured from a respective camera, the accepting including accepting, for each respective accepted image, respective parameters related to the respective accepted image and to properties (collectively the "camera model") of the respective camera that captured the respective accepted image;
- means for accepting input from a user, wherein said means for accepting is configured to accept input from a user to select one of the accepted images to be an initial image, and to accepting input from the user indicating one or more geometric features of interest; and
- means for automatically selecting from the accepted plurality of images and using an optimality criterion an optimal image that is complementary to the initial image for the purpose of determining one or more 3D properties of the indicated one or more geometric features.

In some versions of the digital processing system of the above paragraph, one or more geometric features of interest in the initial image include one of the set of features consisting of a point, a line, and a surface.

In some versions of the digital processing system of any one of the above two paragraphs, called the optimal set embodiments, the means for automatically selecting is also configured to automatically select from the accepted plurality of images one or more additional images forming with the optimal image an optima set, each image of the optimal set being complementary to the initial image for determining 3D properties of the indicated one or more geometric features.

In some versions of the digital processing system described in the above paragraph, the means for automatically selecting further is configured to rank some or all of the images in the optimal set according to the optimality criterion, the ranking according to suitability for use as a complementary image to the initial image, with the highest ranked image being the optimal image.

Some particular embodiments of the digital processing system described in any one of the above four paragraphs (called "the basic four paragraphs") further comprise means for displaying an image and other information to the user, configured to display to the user the optimal image and the one or more geometric features of interest.

In some versions of the digital processing system described in the above paragraph,

- the means for accepting from the user accepting from the user a correction of at least one of the one or more displayed geometric features of interest, such that the location of the correction can be used for determining one or more geometric properties of the geometric feature or features of interest; and
- the means for automatically selecting further is configured to determine one or more 3D properties of the geometric feature or features of interest.

In some versions of the digital processing system of the above paragraph, the one or more 3D properties include the slope of a roof of a building.

In some versions of the optimal set embodiments,

- the means for accepting is further configured to accept from the user a selection of one of the other images from the optimal set to be a new optimal image;
- the means for displaying is further configured to display to the user the new optimal image, with the one or more geometric features of interest displayed on the new optimal image.
- the means for accepting is further configured to accept from the user a correction of at least one of the one or more displayed geometric features of interest on the new optimal image, such that the location on the new optimal image of the correction can be used for determining one or more geometric properties of the geometric feature or features of interest; and
- the means for automatically selecting is further configured to determine one or more 3D properties of the geometric feature or features.

Some versions of the digital processing system described in any one of the basic four paragraphs comprise means for displaying an image and other information to the user, configured to display to the user the optimal image and the one or more geometric features of interest, wherein:

- the means for accepting is further configured to accept from the user an indication of one or more new geometric features of interest, which may be the same geometric features earlier selected in the current initial image, wherein the optimal image after the accepting the indication of one or more new geometric features of interest becomes a new initial image;
- the means for automatically selecting is further configured to automatically select from the accepted plurality of images and using the optimality criterion a new optimal image that is complementary to the new initial image for the purpose of deter; and
- the means for displaying is further configured to display to the user the new optimal image, with the one or more additional geometric features of interest displayed.

In some versions of the digital processing system as described in the above paragraph, the means for automatically selecting is further configured to automatically select from the accepted plurality of images one or more additional images forming with the optimal image an optima set, each image of the optimal set being complementary to the new initial image for determining 3D properties of the indicated one or more geometric features.

In some versions of the digital processing system as described in the above paragraph, the means for automatically selecting further is configured to rank some or all of the images in the optimal set according to the optimality criterion, the ranking according to suitability for use as a complementary image to the initial image, with the highest ranked image being the optimal image.

In some versions of the digital processing system in which the means for accepting is further configured to accept from the user an indication of one or more new geometric features of interest,

- the means for accepting is further configured to accept from the user a new correction of at least one of the displayed one or more new geometric features of interest, such that the location of the new correction can be used for determining one or more geometric properties of the new geometric feature or features of interest; and
- the means for automatically selecting is further configured to determine one or more 3D properties of the indicated new geometric feature or features.

In some embodiments of the above described digital image processing system embodiments that include the means for automatically selecting, the automatically selecting uses as the optimality criterion an overall measure of complementarity of the initial image or new initial image and the geometric feature or features, or new geometric feature or features to a potential optimal image, the overall measure of complementarity including one or more specific measures and corresponding selection criteria. The one or more specific measures include one or more of a measure of the intersection between frustums, a measure coverage, a measure of the intersection between the frustum and an estimated extrusion or arbitrary volume, a measure of angular deviation, and a measure of resolution.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Description in More Detail

Embodiments of the present invention include a method of automatically selecting images for 3D measurements of feature(s) of interest in an initial image.

FIG. 1 shows a simplified flowchart of a machine-implemented method embodiment of the invention. The method is of operating a digital processing system such as that shown in FIG. 14, which shows a schematic of an example system architecture 1400 with elements in which embodiments of the present invention operate. The elements 1401, 1431, 1441, 1451, 1481 are shown coupled via a network 1491, but in other alternate embodiments need not be so coupled. In some embodiments of the invention network 1491 is a public internetwork, in particular embodiments the Internet. These elements 1401, 1431, 1441, 1451, 1481 therefore can be considered part of the network 1491.

In general, the term "engine" as used herein refers to logic embodied in hardware or firmware, or to a collection of machine-executable instructions. Such executable instructions may originally be written in a programming language and compiled and linked into an executable program of the machine-executable instructions. It will be further appreciated that hardware engines may be comprised of connected logic units, such as gates and flip-flops, and/or may be comprised of programmable units, such as programmable gate arrays or processors.

In one embodiment, images are captured by a camera system 1441 and transmitted over the network 1491 to an image storage server 1481 wherein the captured images 1489 are stored with camera parameters such as the camera identity, the camera location, a timestamp for the image, the camera orientation/rotation, the camera resolution, and other camera parameters, the collection of all the parameters called the camera model herein. In one embodiment, the camera is mounted on an airplane or UAV (unmanned aerial vehicle). One such camera is described in U.S. Pat. No. 9,641,736 assigned to the Applicant of the present invention, and in parent patents of said U.S. Pat. No. 9,641,736. Of course, the images used in embodiments of the invention are not limited to those obtained by one or such cameras. Any other camera may be used.

In some embodiments, the images and camera models 1489 are assumed already to have been accepted by system 1400 and stored in the image storage server 1481, so no camera is part of the system when operating. The image storage server includes one or more digital processors (not explicitly shown) and a storage subsystem 1487 that includes memory and one or more other storage elements, and instructions in storage subsystem 1487 that when executed carry out the functions of the image storage server 1481.

One or more images and their respective camera models are accepted, e.g., via the network 1491 and an input port such as a network interface into a digital image processing system 1431 that carries out respective method steps described herein according to program instructions in storage, e.g., 1435 in storage subsystem 1433 executable by at least one processor 1432 of the digital image processing system 1431. Storage subsystem 1433 includes memory and one or more other storage elements.

The image processing system may be partitioned into separate engines.

In one embodiment, a user interacts with the digital image processing system on a client digital processing system 1401 that includes one or more digital processors 1402, a display 1407, a storage subsystem 1403 (including memory), and one or more user input devices 1406 that form a subsystem that enables the user to select and display an image, and to point to and/or draw one or more geometric features in a displayed image. The functions carried out by the client digital processing system 1401 are carried out by executing instructions 1408 stored in storage subsystem 1403. Users may operate the client digital processing system 1401 via respective user interfaces (UIs). The UIs are optionally presented (and the user's instructions may be received) via the client digital processing system 1401 using a browser, other network resource viewer, a dedicated application, or other input means. In general, a person (a user) may enter information into the client digital processing system by at least one of: hovering over, pointing at, or clicking on a particular item, providing verbal instructions via a microphone, the person may touch a touch screen, and the person may otherwise provide information. Thus, one or more user interfaces may be presented on user digital processing system 1401. System 1401 may be a laptop computer, a desktop computer, a user terminal, a tablet computer, a smart phone, or another terminal type. The user input device(s) may include one or more touch screens, microphones, touch pads, keyboards, mice, styluses, cameras, and so forth.

Figure 14:
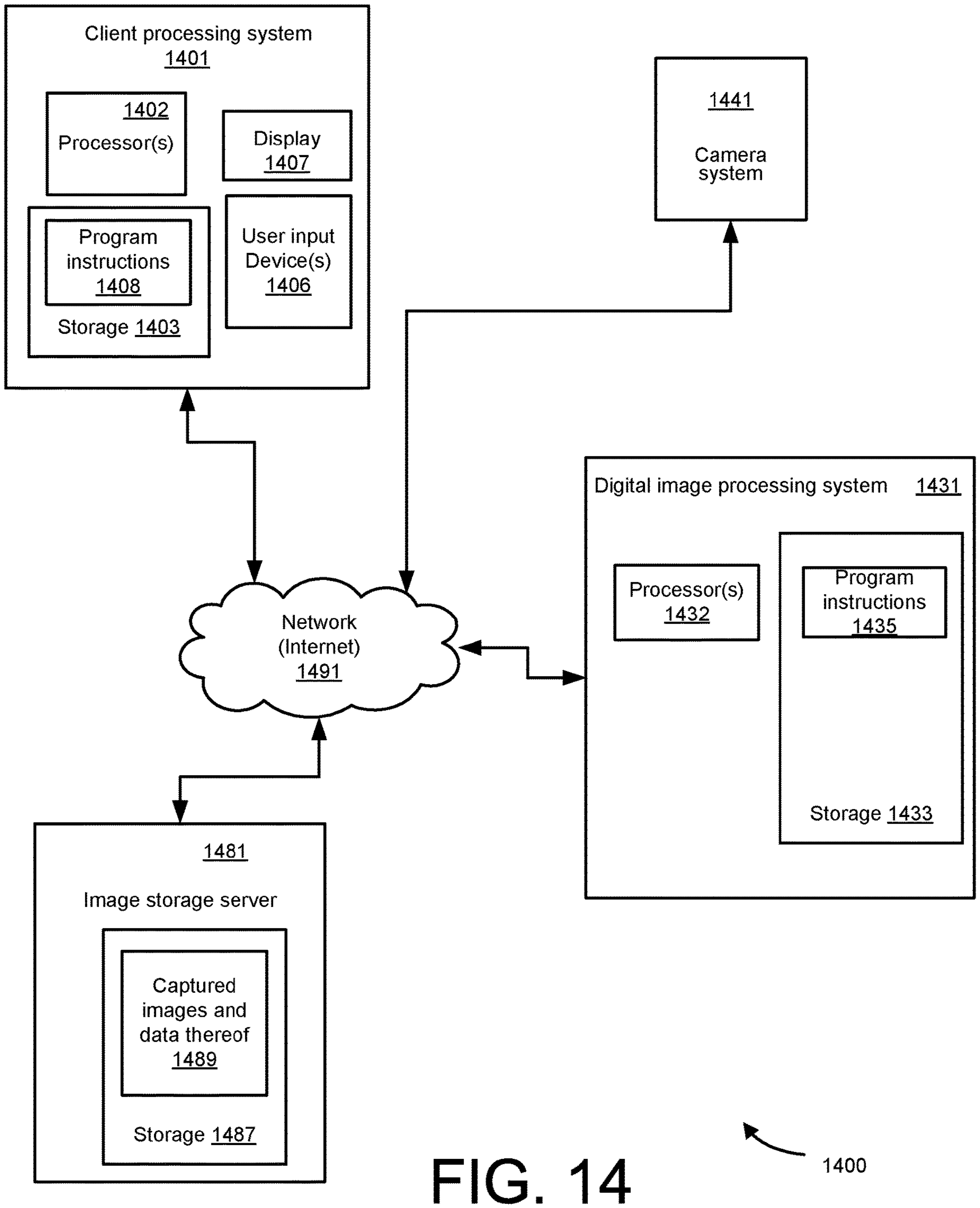
FIG. 14 shows a schematic of an example system architecture with elements in which some embodiments of the present invention may operate.

Note that the elements shown in FIG. 14 are representative. In some embodiments, the digital image processing system may be operating in the Web, e.g., as one or more Web agents, so while such agents include program instructions (shown as 1435) and such programming instructions operate on machines, the machines are not necessarily partitioned as individual digital processing systems as shown in FIG. 14. Furthermore, the machines may be virtual machines instantiated in the cloud. Similarly, the image storage server may be provided as a Web service in the cloud.

In other embodiments, the functionality of the image storage server may be incorporated in the digital image processing system 1431 using storage subsystem 1433 for storing the captured images and metadata 1489.

Furthermore, in other embodiments, the image processing system may be partitioned into separate engines configured to carry out a specific set of steps, including a geometry engine that carries out, inter alia, triangulation and geometrical calculations, a selection (complementarity) engine that calculates the measures of complementarity and the overall measure of complementarity, and selects one or more optimal images.

One skilled in the art would understand that the arrangement shown in FIG. 14 is only one possible arrangement of a system that can operate according to the flowchart of FIG. 1. For example, the system need not operate over a network, and fewer elements may be used. For example, the functionality of the client digital processing system 1401, the digital image processing system 1433, and the image storage server 1481 may be combined into a single digital processing system that includes one or more digital processors, a storage subsystem, a display, and one or more user input device(s).

Returning to the flowchart of FIG. 1, step 103 includes accepting a plurality of images that were taken from distinct camera locations and/or distinct camera orientations, and accepting the respective camera models for the accepted images. At least some of the accepted images are displayed to a user on a user interface that includes providing the ability for the user to select an image, and a pointing subsystem system for the user to select one or more geometric features of interest, such as a point, a line, an area, and so forth.

One or more of the accepted images are displayed to the user, and the user selects an image that shows a region of interest to the user. In some embodiments, the image is simply one of the images on which the user can indicate the region of interest, and then the method, in 105, accept from a user an indication of an initial image, e.g., one that has a good view of one or more points of interest to the user, and displays the initial image and points of interest.

In one embodiment, the presenting to a user of the initial image is on the display 1407 of the client digital processing system (operating as a user terminal) that includes a graphical user interface. A set of instructions carried out on client digital processing system carries out the presenting of the user interface, the accepting of data input to the user interface, and other interactions with the user. Many of the other steps of the flow chart of FIG. 1 are carried out on the digital image processing system 1431.

Each of the steps 107 through 119 may be accompanied by instructions presented to the user via the user interface to guide the user's actions. Such instructions may explicitly request the user to select points or draw lines (or form other geometric shapes) in a specific image, such as for example in an image presented to the user as "primary view" (e.g., the initial image), "secondary view", "tertiary view" or other specifically identified image.

Step 107 includes accepting from the user a selection of one or more 2D points (pixels or interpolated points) in the initial image (or a selected one or more images). A group of such points may be designated to represent a geometric entity in 3D such as a line, one or more triangles, and so forth. Step 107 includes displaying the user selection on the initial image.

Step 109 includes calculating, e.g., in the digital image processing system 1431, or, in some embodiments, in a separate selection (complementarity) engine, one or more selection measures for the initial image in relation to at least some of the accepted images and their respective camera models. The selection measures correspond to selection criteria that may be used to select and rank images according to their respective geometric complementarity, used herein to mean a measure of suitability as a complementary image to the initial image. Thus, some images of the provided plurality of images may be complementary to the initial image, with one having the highest complementarity.

The at least some the accepted images may be preselected from the available accepted captured images according to relevance to the initial image, e.g., the geographic location of the captured images so that the at least some the accepted images includes only images that include the user's selection of point(s) of interest on the initial image. In some embodiments, in addition, some of the images may also be explicitly excluded by the user, e.g., because the images fail some measures of image quality such as insufficient resolution, insufficient sharpness, too much noise, and so forth. In some embodiments, additionally or alternatively, some of the images may be excluded because of measures of presence of undesirable artifacts in the image, such as presence of obstructions of views of one or more points of interest in the image.

Thus, in step 109, each of the selection measures are used to calculate corresponding selection criteria that use one or more image characteristics that are relevant to determining whether or not an image is complementary to the initial image, so that Step 111 of automatically selecting a set of one or more images from the provided plurality of images can be carried out.

Step 111 includes automatically selecting an image from the at least some the accepted images using the selection criteria determined in Step 109 to form the image that is most suitable as a complementary image to the initial image according to a measure of complementarity based on the selection criteria. We call such a most suitable image the optimal image. In some embodiments, While in one embodiment, only a single image, the one that is truly optimal in complementarity, is selected, in other embodiments, step 111 includes automatically selecting at least one other image from the provided images to form what we call an "optimal set" of suitable images, such set including the optimal image. Such an embodiment may include ranking the images of the optimal set according to the measure of complementarity based on the selection criteria. In one embodiment of the invention, the automatic selection in Step 111 is based on carrying out optimization of the selection criteria calculated in Step 109.

Note that in some embodiments, a subset of characteristics and measures is chosen to successfully measure the complementarity of an image depending on the use case and data/characteristics available.

In some embodiments, step 111 includes automatically calculating the locations on the optimal image of the user's selection of point(s) of interest on the initial image. This also may be carried out as a separate step.

Step 111 is carried out in the digital image processing system 1431, or, in some embodiments, in a separate selection (complementarity) engine.

Step 113 includes the method visually presenting to the user the optimal image, together with the user's selection of point(s) of interest, such that the user can correct the location n the optimal image of the user's selection of point(s) of interest to correspond to geometric feature(s) of interest. For example, in one practical application, the user's selection of points of interest may be on the corner's of a planar roof panel in the initial image. These points, when calculated on the optimal image, may no longer be at the edge of the roof panel.

In some embodiments, not only the optimal image, but a subset of one or more images, or all images of the optimal set of suitable images are presented to the user on the user interface. We call these one or more images a "selected subset" of suitable images.

In the following, assume only the optimal image is presented to the user. Consider the optimal image being presented together with the user-selected geometric feature(s) of interest such that the user can correct the location of geometric feature(s) of interest.

At this stage, in some embodiment, the user may not be satisfied with the optimal image selected, e.g., because of the angle or location of the user-selected geometric feature(s) of interest. In such embodiments, the user may desire another image to be the optimal image, e.g., one of the other images of the selected set or complete optimal set). This is shown as decision block 115 notated "User satisfied?", and, responsive to the user not being satisfied (the "No" branch), the user selecting and, in step 117, the method accepting from the user the user's selection of a new optimal image. The method then returns to step 113 using the user selected new optimal image.

In Step 119, the user interface accepts from the user an identification and/or a refinement ("user action(s)") of one or more corresponding points of the represented geometric entity, and displays to the user the accepted identification and/or refinement. In the planar roof example, the user interactively corrects the locations of the two points that for the line edge of the planar roof.

In Step 121, calculations are carried out, e.g., in the digital image processing system 1431, of corresponding results of the accepted user action(s) to the location of the one or more corresponding points of the represented geometric entity, including carrying out 3D triangulation calculations in the optimal image (or, in some embodiments, in one or more of the images from the selected subset). The calculations include determining properties of the geometric entity, e.g., the 3D slope (pitch) and length of a line, the surface area of a planar object, and so forth. Step 121 further includes displaying the corresponding results on the graphic display of the optimal image (or one or more of the images from the selected set), including the calculated properties, e.g., one or more of line length(s), slope/pitch, and other one or more applicable parameters of the represented geometric entity.

Note that in alternate embodiments, once the optimal image is displayed to the user (113), the user may select to return to step 107 with the optimal image now a new initial image, and in step 107 cause the method to accept from the user further points, e.g., additional endpoints making one or more additional lines. The old optimal image is the new initial image and step 109 proceeds with the newly added further points.

A Simplified Block Diagram

Figure 2:
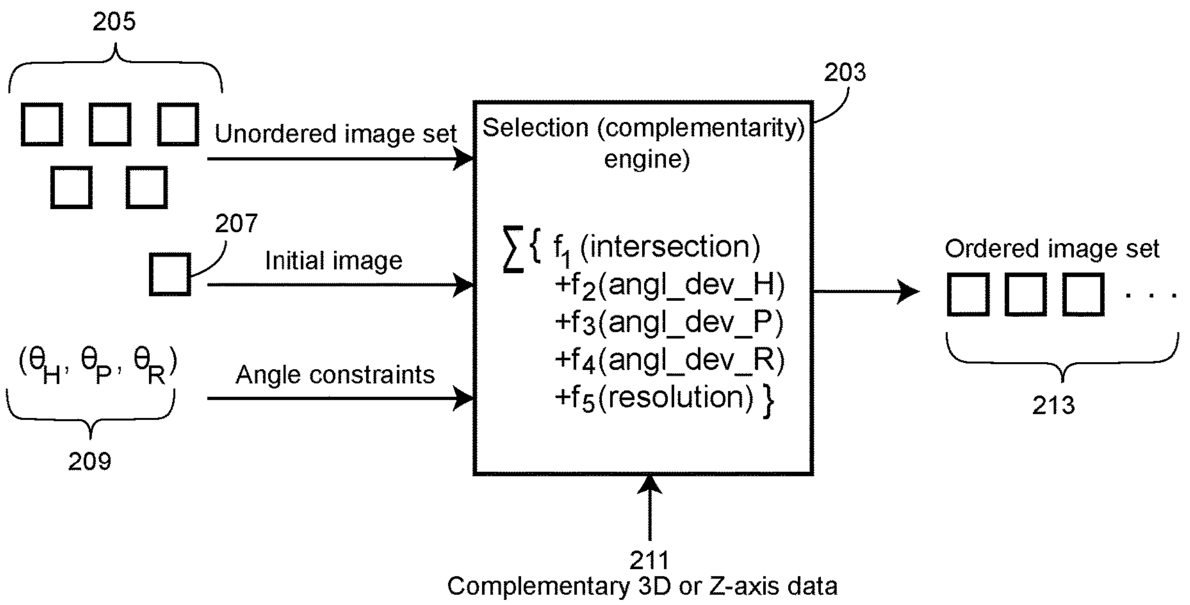
FIG. 2 shows a simplified schematic of a process for calculating geometric complementarily, according to an embodiment of the invention.

FIG. 2 shows a simplified block diagram of the data flow of an embodiment of the invention. The image set includes an unordered set 205 of images and an initial image 207. A selection (complementarity) engine 203 uses selection criteria based on the set of selection measures. In some embodiments, the selection (complementarity) engine 203 is implemented in the image processing system 1431. These selection measures may include, along with the camera model described above, angle constraints 209 in heading, pitch, and roll, the constraints denoted as θH, θP, and θR, respectively. Note that in this context, in some embodiments, pitch refers to the angle from the horizon to the ground. Thus, if the camera pointed directly down. e.g., forming an image of the top of a house, then the image has a pitch of 90 degrees. One the other hand, an image of the horizon would have a pitch of 0 degrees; In some such embodiments, heading means the angle with respect to due north, such that if a camera pointing straight down takes an image, the image, for example of the top of a building is at 90 degree heading, while an image of the horizon is at 0 degree heading.

Also used in some embodiments are complementary 3D and/or Z-axis data 211 (which may be of a "2.5D" variety) such as a digital surface model (DSM), and/or mesh data (e.g., as triangle surfaces). The results determined by the selection (complementarity) engine 203 may include an ordered set 213 of images, the ordering according to the overall measure of complementarity, or in some embodiments, the single optimal image.

Geometric Complementarity Measures, Criteria and Input Parameters

Terminology

The initial image 207 is the first image in which a feature is selected or which contains a point of interest. An "initial camera model" includes a set of characteristics that describe the apparatus (called a camera herein) used to capture the initial image. The "optimal image" is the highest scoring (most complementary) image for the initial image 207. The "optimal camera model" is a set of characteristics that describe the apparatus used to capture the "optimal image." The "image set" 205 is all available images excluding the initial image. The optimal set 213 is a set of images ranked according to a complementarity score for the initial image 207.

Camera and Other Apparatus Characteristics

The "camera model" for a particular image includes the location of the camera system at time of capture (e.g. easting, northing, altitude, UTM coordinates), the rotation and orientation (e.g. heading, pitch, and roll) of the camera system at time of capture, and the resolution of the camera system used, and may include the lens distortion model of the camera system used and the sensor type and shape of the camera system used. Similarly, a "specific viewport" may be used to describe a local portion of the image, which could be described by zoom, or a local boundary within the image in pixels. Note that a "lens distortion model" may be a function of multiple camera sensor and lens characteristics.

Other complementarity properties that may be used pertaining to the image that may have been determined via other means include the estimated ground height, the maximum height of the user-selected feature, digital surface model (DSM) or known feature geometries in similar or same locations.

Selection Measures and Criteria

The selection (complementarity) engine 203 of FIG. 2 in one embodiment uses a set of selection criteria, each using corresponding selection measures used to determine geometric complementarity of images, e.g., of the initial image and its user-selected geometric feature(s) of interest to a potential optimal image. The corresponding selection measures used in the selection criteria include at least some, in some embodiments all, and in yet other embodiments just one of the measures and corresponding selection criteria described below.

Measure/Criteria of the Intersection Between Frustums

Figure 3:
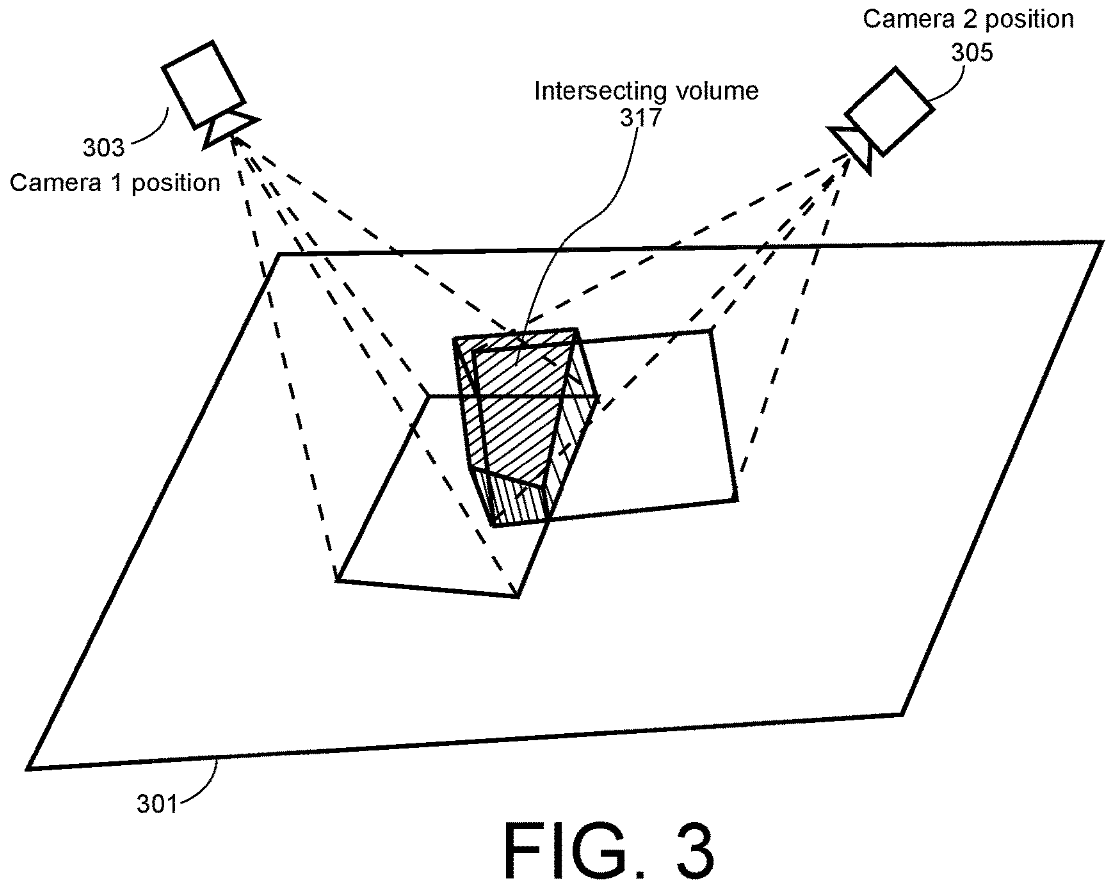
FIG. 3 shows a simplified schematic of an intersection of camera frustums used as one viable measure of image overlap, according to an embodiment of the invention.

FIG. 3 shows a simplified drawing of an intersection of camera frustums used as a viable measure of image overlap, according to an embodiment of the invention. This is included in $f_1$(intersection) shown in engine 203 of FIG. 2, which shows two camera positions 303 and 305, the capture areas 313 and 315 on a surface 301, typically the ground, and an intersection volume 317 of the two camera frustums over the overlap of areas 313 and 315, such the intersection volume forms a measure of the overlap. Such measure is obtained by calculating the intersection volume 317 formed by the initial camera model frustum and camera model frustum of the potential optimal image (called the potential optimal camera model frustum), by projecting each camera position's lens bounds (rays) onto the surface 301 containing a user-selected geometric feature (not shown in FIG. 3) and determining where they overlap, and/or by what percentage they overlap, and/or the total intersection volume. The formulae for such an intersection can be determined using straightforward geometry, as would be known to those in the art, and as taught inter alia in computer graphics courses. See for example Y. Zamani, H. Shirzad and S. Kasaei, "Similarity measures for intersection of camera view frustums," 2017 10th Iranian Conference on Machine Vision and Image Processing (MVIP), Isfahan, 2017, pp. 171-175. Examples of use of such formulae can also be found in: S. Hornus, "A review of polyhedral intersection detection and new techniques," [Research Report] RR-8730, INRIA Nancy—Grand Est (Villers-lès-Nancy, France), pp. 35; 2015; in M. Levoy, "A hybrid ray tracer for rendering polygon and volume data," TR89-035, The University of North Carolina at Chapel Hill Department of Computer Science, 1989; and in G. T. Toussaint, "A simple linear algorithm for intersecting convex polygons," The Visual Computer, August 1985, Vol. 1, No. 2, pp 118-123.

One embodiment of the invention uses as a criterion based on the measure of the intersection between frustums as follows: the greater the overlap between the frustums of the initial image and the potential optimal image, the greater the chance that the feature is included in the potential optimal image.

Measure/Criteria of Coverage

Figure 4:
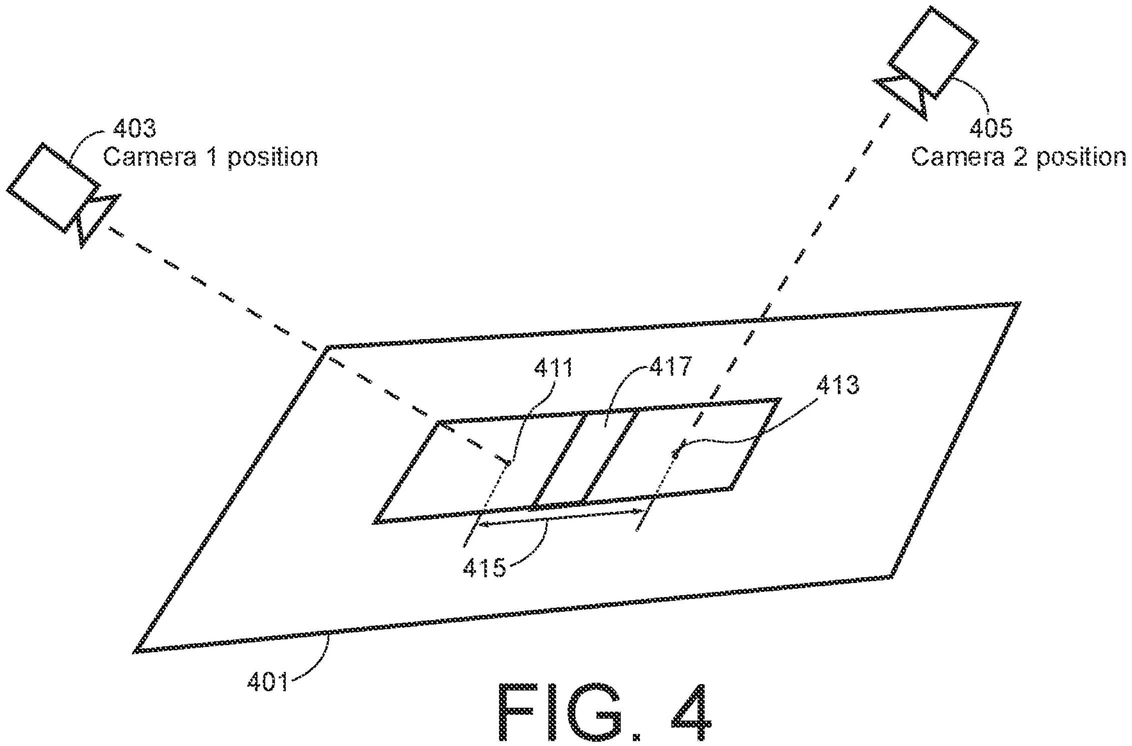
FIG. 4 shows a simplified schematic of the distance between the locations of image centers, which may be used as one viable measure of geographical closeness/coverage, according to an embodiment of the invention.

Another selection measure is a measure of geographical closeness or coverage. This is also included in the function $f_1$(intersection) shown in engine 203 in FIG. 2. In one embodiment, this measure is determined by calculating the distance between the locations of the center pixel of each image obtained by a respective camera once the images have been projected onto a surface. FIG. 4 shows a simplified schematic of two overlapping images obtained by two cameras 403 and 401, labeled camera 1 and camera 2, respectively the images having respective center pixels at surface location 411 and surface location 413, respectively. One measure of closeness is the distance 415 between the two centers. Another measure, but equally viable, is the 2D overlap 417 (coverage) of one image over another on the projected surface, in terms of area of percentage, a measure known to those skilled in the art. Another measure of closeness is the calculated distance between the location of the user-selected feature in the initial image and the center pixel location of each image that may be a complementary image. The formulae for such distance may be determined using straightforward geometry, and such calculations would be known to those in the art.

In the code below, we define distance=surface location2−surface location1, where distance and the surface locations are 2D or 3D vectors.

One embodiment of the invention uses as a criterion based on the measure of coverage, stating that: the smaller the distance between the locations described by the initial image center pixel or feature in the initial image and the potential "optimal image" center pixel, the higher the "coverage" of the potential optimal image over the initial image, and therefore the higher the chance the feature is included in the potential optimal image.

Measure/Criteria the Intersection Between Frustum and Estimated Extrusion

Figure 5:
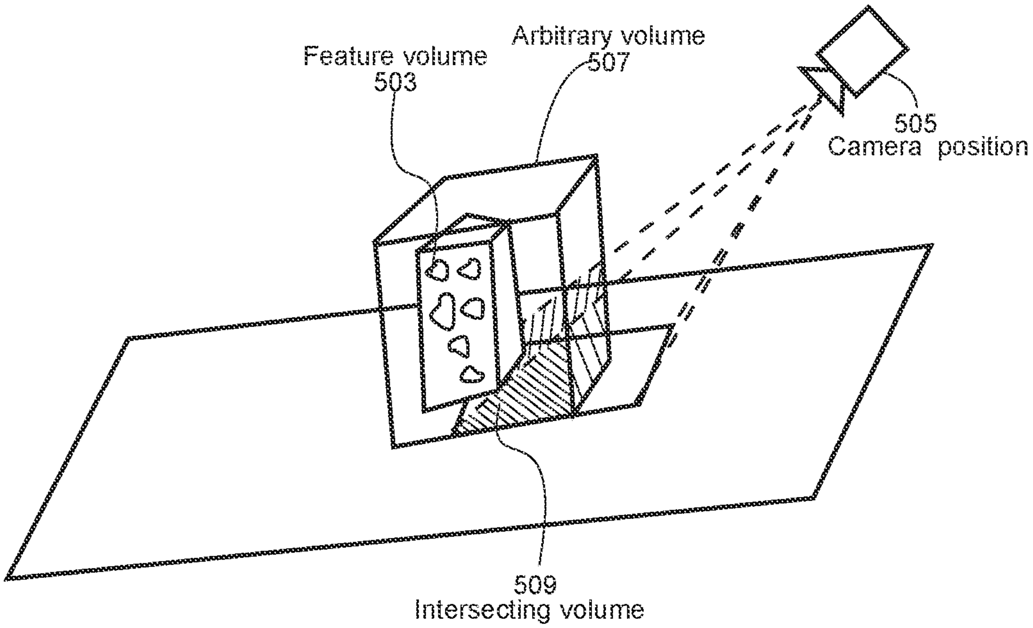
FIG. 5 shows a simplified schematic of the intersection of a potential optimal image's frustum with an estimated volume around a feature of interest. Such an intersection may be used as one viable measure of the presence of the feature in the potential optimal image, according to an embodiment of the invention.

Another selection measure is the measure of intersection between the frustum and an estimated extrusion or arbitrary volume. It is highly likely that the user-selected feature of interest will not lie exactly on the 2D plane represented by a potential complementary image, in that a non-planar feature that was planar on the initial image may extrude out of the plane, or be elevated off the plane in another image of the image set. Therefore, there will be a volume surrounding the feature that may extend in a particular direction, or be of a particular shape, unrelated to the frustum of the camera models of the initial and potential optimal image. The optimal image's frustum should maximise the intersection of this arbitrary volume surrounding the user-selected feature of interest. This measure is determined as the intersection between the potential optimal image's frustum intersecting with the arbitrary volume. FIG. 5 shows as a simplified schematic one camera 505 (a second camera is not shown) and an intersecting volume between the frustum and an arbitrary volume 507 that is around an estimated volume that includes the feature of interest. How to determine such an intersecting volume uses straightforward geometry, and the formulae for such are the same as for the measure of the intersection between frustums. If used, this measure is also included in $f_1$(intersection) in engine 203 of FIG. 2.

One embodiment of the invention uses as a criterion based on the measure of frustum and estimated extrusion intersection that: the greater the intersection between the potential optimal image frustum and the estimated/arbitrary volume surrounding the feature, the greater the chance that the feature is included in the potential optimal image.

Measure/Criteria of Angular Deviation

Another measure is that of angular deviation. In some applications, the requirements of the application may lead to an acceptable range of or to constraints on the rotation and orientation characteristics of the camera models. The determining of an optimal image by the selection (complementarity) engine 203 may accommodate such ranges or constraints. Angular deviation, called angle constraints and denoted $\theta_H$, $\theta_P$ and $\theta_R$ for heading, pitch, and roll in FIG. 2, can be measured and constrained in many ways, for example by using visual acuity measures described below, by simply measuring the rotational parameter of the camera apparatus, and/or by providing application specific constraints.

Essentially, the measure of angular deviation is a measure of "visual acuity," which is the spatial resolving capacity of a visual system. See for example M. Kalloniatis, C. Luu, "Visual Acuity," In: Kolb H, Fernandez E, Nelson R, editors, Webvision: The Organization of the Retina and Visual System [Internet]. Salt Lake City (UT): University of Utah Health Sciences Center; 1995, last modified 5 Jun. 2007, available at webvision~dot~med~dot~utah~dot~edu/book/part-viii-gabac-receptors/visual-acuity/, retrieved 11 Sep. 2018, where ~dot~ denoted the period (".") character in the actual URL. This Kalloniatis and Luu paper describes a measure of "Minimum Angle of Resolution," "Angular Resolution," or "MAR", defined as the minimum angle of separation such that an optical instrument can resolve two points that are close together in two distinct objects, and would describe to one skilled in the art, an obvious constraint in resolving two points in 3D space, particularly in terms of accuracy, but also occlusion.

Two such functions for spatial and for angular resolution may be, for example:

Angular resolution=1.220×(wavelength of light/diameter of lens aperture); Spatial resolution=1.220×((focal length×wavelength of light)/diameter of light beam)).

See for example the Wikipedia article "Angular Resolution," at en~dot~wikipedia~dot~org/wiki/Angular resolution, last modified 25 Jun. 2018, retrieved 11 Sep. 2018, where ~dot~ denoted the period (".") character in the actual URL.

Figure 6:
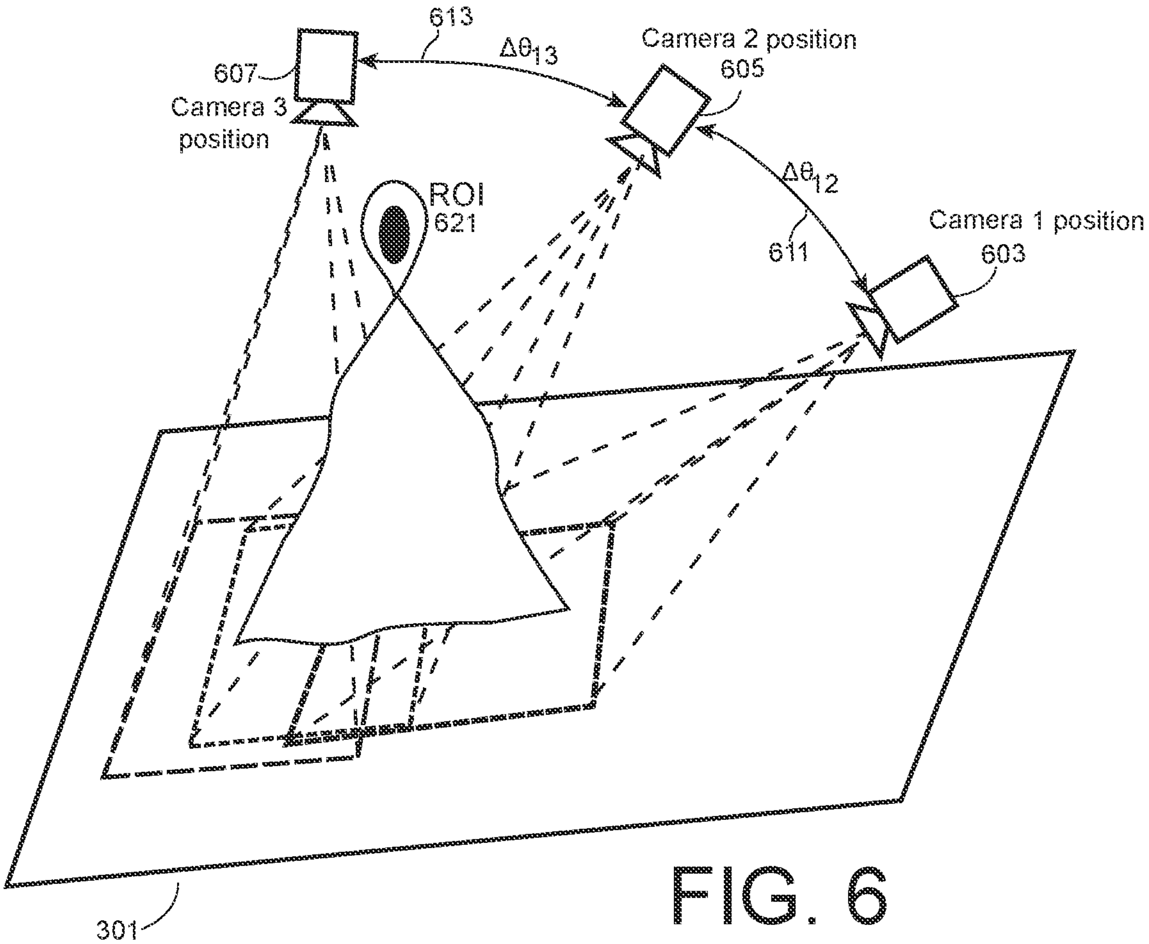
FIG. 6 shows a simplified schematic of three cameras denoted 1, 2, and 3, and a user-selected region of interest denoted R.O.I. The drawing may be used to explain how angular deviation and constraints can impact the presence of the feature of interest in a potential optimal complementary image according to an embodiment of the invention.

FIG. 6 shows as a simple schematic three cameras denoted camera 1 603, camera 2 605, and camera 3 607, and a user-selected region of interest 621 denoted ROI. The angle 611 between camera 1 and camera 2 is denoted $\Delta\theta_{12}$, and that between camera 2 and camera 3 is denoted $\Delta\theta_2$. The above visual acuity calculations may apply to the heading, pitch or roll of the system ($\theta_H$, $\theta_P$ and $\theta_R$), or any other measure of angular change between two images. Formulae for determining angular constraints would be known to those in the art, and available in the references provided above.

Another angular constraint that may be used in some embodiments of the invention is related to a limitation in the particular camera system in which the oblique (multi-view) imagery is captured in such embodiments. The images from such cameras are along the cardinal directions of North, South, East and West, which means a minimum 90 degree separation for some views. This provided a particular case of angular constraint, whereby the user of the graphical user interface might become disorientated, and therefore unable to identify a feature of interest. Consider, for example, a case that the view was to switch by 90 degrees to another cardinal direction. The rotation of the feature of interest may, to the user, have been distorted in such a way that the user cannot easily comprehend the feature's geometry. Therefore, in some embodiments, a purely user-provided and non-mathematical constraint is applied such that the system is weighted to give higher priority to images taken the same cardinal direction as the initial image.

One embodiment of the invention uses as a criterion based on the measure of angular deviation that the more the angular deviation fits into the range or constraints provided, between the initial image and the potential optimal image, the greater the chance that the feature will be visible in both images, and that the viewport is acceptable for the particular use case.

The measures of angular deviation in heading, pitch, and roll are shown as $f_2$(ang_dev_H), $f_3$(ang_dev_P), and $f_4$(ang_dev_P), respectively, in engine 203 of FIG. 2.

Measure/Criteria of Resolution

A fifth measure is a measure of resolution, shown as $f_5$(resolution) in FIG. 2. Given that the projection of the image onto the surface results in a particular resolution, the identification of a point in multiple images, and the accuracy of the identification or geometry extraction will also be resolution dependent, where accuracy is a function of resolution, focal length and distance from the camera sensor to the point of interest. Resolution also has a direct impact on the angular deviation constraints and angular resolution equations described above. Resolution can be measured in a system in many ways, but some such examples include GSD, or pixel density. Resolution can be constrained in many ways, described mathematically for example by using a clamp function, constraint function, a filter function, or a range function to determine the suitability of certain resolutions. Formulae for such functions would be known to those in the art, and available in the references provided:

One such measure of resolution is that of Ground Sampling Distance (GSD), which is a measure of the distance one pixel will cover on the plane the image is projected upon (usually onto some known ground height). Formulae for determining a GSD would be known to those in the art. One example is.

GSD=Pixel Size×(Elevation above ground/focal length).

A smaller GSD indicates a greater resolution. In some embodiments of the invention, priority is given priority to images wherein the GSD is less than or equal to the GSD of the initial image.

One embodiment of the invention uses as a criterion based on the measure of resolution that: the greater the resolution of the potential optimal image meets the resolution range or constraint, the greater the ability for the feature to be visible, and the more accurately the feature is identified.

In some embodiments, the overall measure of complementarity used by the selection (complementarity) engine 203 to select and rank images is.

$$\text{Complementarity} = \sum \{f_1(\text{intersection}) + f_2(\text{ang\_dev\_H})\} + f_3(\text{ang\_dev\_P}) + f_4(\text{ang\_dev\_P}) + f5(\text{resolution})\}.$$

General Geometric Analysis Process

The following steps describe one embodiment of a process of geometric analysis used by the selection (complementarity) engine 203 to select and rank images according to a measure of optimality (i.e., measure of complementarity). Note that while these steps are called first step, second step, etc., no order of these steps being carried out is implied.

In one embodiment of the invention, a first step includes selecting camera and other apparatus characteristics that are used. In this step, all or a subset of the apparatus characteristics described in the "Camera and other apparatus characteristics" subsection above are selected depending on the particular use case.

A second step includes creating a weight function of how each of the selection criteria and characteristics that are used are to be weighted in the overall optimality criterion, such a weight function, e.g., a set of weights, being based on the requirements of the particular application. As an example, for purpose of triangulation one would give a higher weight to the angular deviation of the images in order to give preference to greater difference in the pitch of the capture apparatus so as to accurately resolve a selected point or geometric feature(s) of interest.

The following example of a method of creating weight functions in one particular embodiment. The method comprises sorting the images by complementarity score to the initial image, e.g., as the sum of the position score, heading deviation score, and the pitch score. For the position score, the method add 1 point for every 200 meters from perfectly cantered, where perfectly centered means the center of the line of interest formed from two user selected points is situated at the center of the image. For the heading deviation (difference in degrees) score, the method determines the heading difference (in degrees) from the heading of the initial image, and deletes one point for every 22.5 degrees of heading deviation. In some embodiments, heading is the angle with respect to due north, so that, for example, if the image is of a southern facing wall of a house, the camera would have been due north, such that the heading would be 0 degrees. For the pitch difference score, the method adds 1 point for every 22.5 degrees of pitch difference (deviation) between the image pitch and the pitch of the initial image, where, in some embodiments, the pitch is the angle from the horizon to the ground, so that, for example in some embodiments, if you were looking at an image of the top of a house (with the camera pointed directly down), then the image has a pitch of 90 degrees, while an image of the horizon would have a pitch of 0 degrees.

In some embodiments, the weight function creation method further comprises removing any image where that is too similar in angle to the initial image. One version uses as the criterion for too similar that the sum of the heading angle deviation and the pitch angle deviation is less than or equal 20 degrees. The weight function creation method further comprises removing any images where any part of the line (in the case of two endpoint being indicated) falls outside of the image. For this step, the ratio, e.g., as a percentage of volume of intersection of each potential optimal image's frustum volume intersecting with the initial image's frustum volume versus the volume created by the initial image frustum. This intersection percentage and the camera rotation angles are scored and weighted using the weight function to determine the optimality criterion for each potential optimal complementary image.

A third step includes selecting an initial image and accepting into the digital processing system the initial image's characteristics. This corresponds to step 105 in the flowchart of FIG. 1.

A fourth step includes, for each potential optimal image in the image set, using such each image's characteristics to calculate a value for each of the measures used (from the above five selection measures). Each calculated measure is multiplied by the corresponding weight using the created weight function.

A fifth step includes summing the weighted measures or characteristics for each potential optimal image in the image set to form such image's optimality criterion.

A sixth step includes ordering (ranking) the potential optimal images in the image set according the optimality criterion, and selecting the top ranked image as the optimal complementary image for the chosen initial image and selected geometric feature(s) of interest therein. The fourth, fifth, and sixth steps correspond to steps 107, 109, and 111 of the flowchart of FIG. 1.

As described herein, in some embodiments, once the optimal complementary image is selected, it is displayed to the user (in step 113 of the flowchart of FIG. 1). The location on the optimal image of the user-selected geometric feature(s) of interest from the initial image is calculated and displayed to the user on the optimal complementary image. The user may then (see step 1119 of FIG. 1) correct the placement of the region, e.g., a point, line, area etc. Step 121 of FIG. 1 includes using the user-entered correction to calculate one or more applicable parameters of the user selected geometric entity.

Example Embodiment A

For this embodiment called embodiment A, we describe how to use a particular subset of the camera model characteristics and use only the "frustum-overlap" selection measure and criterion in order to selecting the optimal image for the selected initial image and geometric feature(s) of interest. The location, rotation, orientation, lens distortion and sensor shape characteristics of the camera model are chosen for this example embodiment and are used as the input parameters into the selection process.

Thus, in accordance with example embodiment A, a user selects an initial image and causes the initial camera model's location, rotation, orientation, sensor shape, and lens distortion to be recorded. The user also selects a point (a 2D pixel coordinate) in the initial image to define the geometric feature of interest (in this case, a point). It is desired to estimate this point's geometry in 3D using an embodiment of the method of the invention to select the optimal complementary image for this initial image and geometric feature of interest, and then to use the complementary image to determine the 3D location of the feature.

In embodiment A, it is assumed that the sensor of the initial camera model has quadrilateral shape. Such shape and the lens distortion are used to cast rays from the boundary corners of the sensor to the surface (i.e., the corners of the initial image). The volume formed by the intersection of these rays with the surface forms a volume referred to as a frustum.

Using the initial camera model's location, rotation and orientation a transformation matrix is determined that can transform the above calculated frustum volume geometry to actual real location in space, such that the method now has a frustum volume from the initial image's camera location to the initial images location on the surface, as shown in FIG. 3.

The method continues with examining each of the available images in the image set. For such image (a potential optimal image), the image's camera model location, rotation, orientation, sensor shape and lens distortion are recorded. As per the frustum calculation for the initial image, each other image has a sensor boundary frustum volume projected and intersected with the surface and transformed via matrix transformation to its real location in space using the camera model location, rotation and orientation.

The method calculates the ratio, e.g., as a percentage of volume of intersection of each potential optimal image's frustum volume intersecting with the initial image's frustum volume versus the volume created by the initial image frustum. This intersection percentage and the camera rotation angles are scored and weighted using the weight function to determine the optimality criterion for each potential optimal complementary image.

In this embodiment A, there are two angle constraints, termed pitchConstraint and headingConstraint in the following sample functions, where pitchConstraint is the minimum pitch angle difference, and headingConstraint is the maximum heading difference, between the initial camera model and the potential optimal image's camera model. In FIG. 2, pitchConstraint and headingConstraint are denoted $\theta_P$ and $\theta_H$, respectively.

In this example embodiment A, a respective optimality score function is created for each respective variable.

As an example, the following pseudocode describes that returns an intersection score, called the intersection percentage score as a percentage of originalFrustumVolume covered by intersectionVolume, the range being 0-100:

```
score (intersectionVolume, originalFrustumVolume)→{
    (intersectionVolume/originalFrustumVolume)*100.
    }.
```

The following pseudocode describes a second function that returns a second score called the pitch variance score (range 0-100) for all pitches that are greater than pitchConstraint degrees variance from the initial image's pitch:

```
score (initialPitch, otherPitch, pitchConstraint)→{
    diff=absolute(initialPitch−otherPitch)
    if (diff<pitchConstraint) {
        return 0
    } else {return ((180−pitchConstraint-diff)/(180−pitch-
        Constraint))*100}
}.
```

The following pseudocode is for a third function that returns a third score, called the heading variance score in the range 0-100, where 100 is a very small deviation in heading, and 0 is a very large deviation in heading:

```
score (initialHeading, otherHeading, headingConstraint)
    →{
    diff=absolute(initialHeading−otherHeading
    if (diff<headingConstraint) {
        return headingConstraint−diff*10
    } else {return 0}
}.
```

Recall that in the embodiments described herein, the camera system used to capture images is limited to be in the N,S,E,W cardinal direction only, such that the set of images contains images only in these cardinal directions, and separated at minimum of 90 degrees (or very close thereto). Furthermore, given the user orientation constraint, the headingConstraint used in this embodiment A is 90 degrees (as an example). The pitchConstraint, in this example is the minimum angular resolution described in the formulae above, applied to the pitch parameter of the camera model's orientation ($\theta_P$).

For this example embodiment A, a weight function was created to weight each of the scores. The intersection percentage score was multiplied by 0.5, and the pitch variance score was multiplied by 2. The heading variance score was multiplied by 1 (i.e., left as is). The overall optimality criterion for is the sum of the weighted scores, leading to complementarity score out of a maximum score of 350 for each potential optimal image.

The method of embodiment A selects as the optimal image that with the highest optimality criterion. Such optimal image is presented to the user as used as the next image in which to locate the point of interest.

Example Embodiment B

Another example embodiment, called embodiment B is a method that uses the measure of geographical closeness or coverage between the initial image and a potential optimal image using the distance between the center pixel location of the initial image viewport and the center pixel location (principal pixel location) of the potential optimal image as illustrated in FIG. 4. The location, rotation, orientation, lens distortion and sensor shape are the camera model characteristics used as the input parameters.

A user selects an initial image which selection the method accepts. The initial camera model's location, rotation, orientation, sensor shape and lens distortion are accepted into the method. The user selects a point (2D pixel coordinate) in the initial image which is accepted into the method as the geometric feature of interest whose geometry in 3D is to be determined.

The embodiment B method includes determining the real location of the initial image viewport center using the initial camera model's lens distortion model and sensor shape, and the location, rotation and orientation of the initial image camera model. The determining includes casting (projecting) a ray from the sensor to the surface at the point of the center of the viewport, and transforming its position into its real location in space using a transformation matrix that uses the initial camera model location, rotation and orientation. How to carry out such a transformation would be clear and straightforward to one of ordinary skill in the art.

For each potential optimal image, the embodiment B method includes determining the real location of the potential optimal image viewport center. The method further transforms the projected location viewport center on the surface using the location, rotation and orientation of each potential optimal image. The method further includes calculating the principal pixel (2D pixel coordinate), which is the pixel whose ray when cast lands at the center of the camera sensor. This principal pixel will have a projected location on the surface. The method calculates the principal pixel's projected location, by using a transformation matrix calculated by the location, rotation and orientation of the camera model at the time of capture of the image. How to carry out such a transformation would be clear and straightforward to one of ordinary skill in the art.

At this stage, the method has a center location for each potential optimal image in the image set, and a center location for the center pixel of the initial image viewport (which may be the principal pixel location if the viewport is the extent of the image bounds).

The embodiment B method calculates the distance between the initial image "point of interest location" and each potential optimal image's center location. This measure is one example of how to measure geographical closeness between the point of interest and the center point of each image.

As in the embodiment A method, there are some angular constraints required by the particular case, and these are denoted termed pitchConstraint and headingConstraint.

As in the embodiment A method, a score function is created for the center distance, pitch variance and heading variance, where center distance is the distance from the initial image center pixel location and each other images center pixel location.

As in the embodiment A method, a weight function is created to weight each of the scores. The sum of the weighted scores provides the overall score for each potential optimal image. The method includes ordering the potential optimal images according to their respective overall score. The highest scoring image was the optimal image for selection based on the initial image.

Pseudocode Describing an Example Embodiment B Method

The following function is used in the method of embodiment B, as for example, optimise(100, 10, 20, [image1, image2, image3]). In the following pseudocode:

$C_{i0}$=location on surface of feature in initial image
$H_{i0}$=heading of camera of initial image
$P_{i0}$=pitch of camera of initial image
Set[$i_N$]=set of N other images
$C_N$=distance from initial image viewpoint center location to image N center
$H_N$=difference in initial image heading and image N heading
$P_N$=difference in initial image pitch and image N pitch
$W_c$=weighting for center distance
$W_h$=weighting for heading difference
$W_p$=weighting for pitch difference
$C_T$=center score for image N given $C_N$ and weight
$H_T$=heading score for image N given $H_N$ and weight
$P_T$=pitch score for image N given $P_N$ and weight
imageScore=sum of scores
optimalImage=the first image of the newSet when sorted by max score.

The following is example pseudocode for a function optimise that returns optimalImage:

```
optimise(C_i0, H_i0, P_i0, Set[iN])=>{
newSet( )
for each image in Set[iN]:
  C_N=distance from C_i0 to C_iN
  H_N=difference from H_i0 to H_iN
  P_N=difference from P_i0 to P_iN
  W_c, W_h, W_p=weightFunction(image);
  C_T=scoreFunction (W_c, C_N)
  H_T=scoreFunction (W_h, H_N)
  P_T=scoreFunction (W_p, P_N)
  imageScore=C_T+H_T+P
  newSet.add(imageScore)
  break
optimalImage=max(newSet)
}.
```

FIG. 8 shows example code for implementing the embodiment B method.

Example Embodiment C

Another example method embodiment referred to as example embodiment C is a case where complementary 3D data Is used as additional data in the selection method, and the selection process uses the selection criterion based on the extrusion volume intersection measure. The location, rotation, orientation, lens distortion and sensor shape are the characteristics used as the input parameter subset. Similarly, the average ground height and maximum feature height are the complementary inputs, previously determined by a separate method are also inputted into the system. This implementation assumes that such complementary inputs are available. In one embodiment, the average ground height is calculated from a histogram of feature point heights collected from a DSM (digital surface model) localized to the images projected photo bounds on the surface. An assumption is made about building heights, being that the feature, for this purpose will likely be a vertex of a building, and that most buildings aren't greater than 500 m in height. This is the dimensions of the arbitrary volume (500 m×500 m×500 m), centered at the point of interest and bounded by the image bounds intersection points on the surface, for example. Of course, in different applications, e.g., for extreme high-rise buildings over 500 m in height, different assumptions would be made, and the arbitrary volume will be larger.

A user selects an initial image which the selection method accepts. The initial camera model's location, rotation, orientation, sensor shape and lens distortion are accepted into the method. The user selects a point (2D pixel coordinate) in the initial image which is accepted into the method as the geometric feature of interest whose geometry in 3D is to be determined.

The embodiment C method disclosed herein assumes that an average ground height in the initial image is known, and similarly the information about the maximum feature height at the location of interest is known. For example, the maximum feature height could be obtained by knowing that a city has height restrictions on its buildings.

As in the case of method embodiment A, it is assumed that the sensor of the initial camera model has quadrilateral shape. Such shape and the lens distortion are used to cast rays from the boundary corners of the sensor to the surface (i.e., the corners of the initial image). The volume formed by the intersection of these rays with the surface forms a volume referred to as a frustum.

Again, as in the case of method embodiment A, using the initial camera model's location, rotation and orientation a transformation matrix is determined that can transform the above calculated frustum volume geometry to actual real location in space, such that the method now has a frustum volume from the initial image's camera location to the initial images location on the surface, as shown in FIG. 3 and in FIG. 5.

Figure 7:
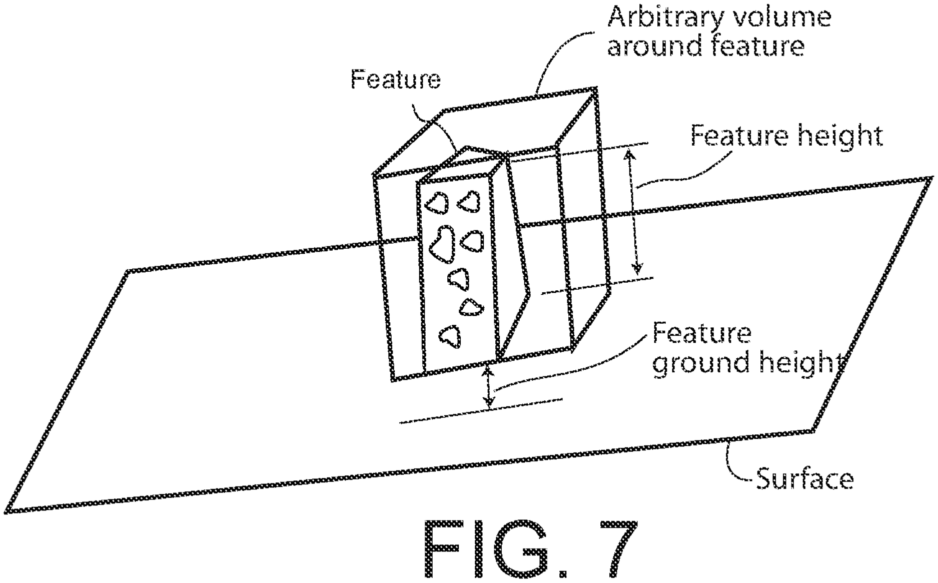
FIG. 7 shows a simplified schematic of an arbitrary or estimated volume that can be created around a feature given complementary 3D information, according to an embodiment of the invention.

The method includes creating an estimated volume by selecting the points on the surface where the initial camera frustum intersects with the surface. The method includes elevating these points to the inputted average ground height, and creating a cuboid at those elevated points that extended upwards to the height of "maximum feature height." FIG. 7 shows a simple drawing to illustrate these method steps.

The method includes for each of the potential optimal images in the image set, accepting potential optimal image's camera model location, rotation, orientation, sensor shape and lens distortion model. As per the frustum calculation for the initial image, for each potential optimal image, using the potential optimal image's camera model's location, rotation and orientation a transformation matrix is determined that can transform the frustum volume geometry to actual real location in space, such that the method now has a frustum volume from each potential optimal image's camera location to each images location on the surface. The method includes creating an estimated volume by selecting the points on the surface where said each potential image's camera frustum intersects with the "estimated volume" described above and the percentage the intersection volume is of total estimated volume is saved for each such image. This is illustrated in the drawing of FIG. 5.

As in the embodiment A and embodiment B methods, there are some angular constraints required by the particular case, and these are denoted termed pitchConstraint and headingConstraint.

As in the embodiment A and embodiment B methods, a score function is created for the intersection volume percentage, pitch variance and heading variance.

As in the embodiment A and embodiment B methods, a weight function was created to weight each of the scores. The sum of the weighted scores provides the overall score for each potential optimal image. The method includes ordering the potential optimal images according to their respective overall score. The highest scoring image is the optimal image for selection based on the initial image.

A Particular Example of Measuring the Slope of a Roof

Figure 9:
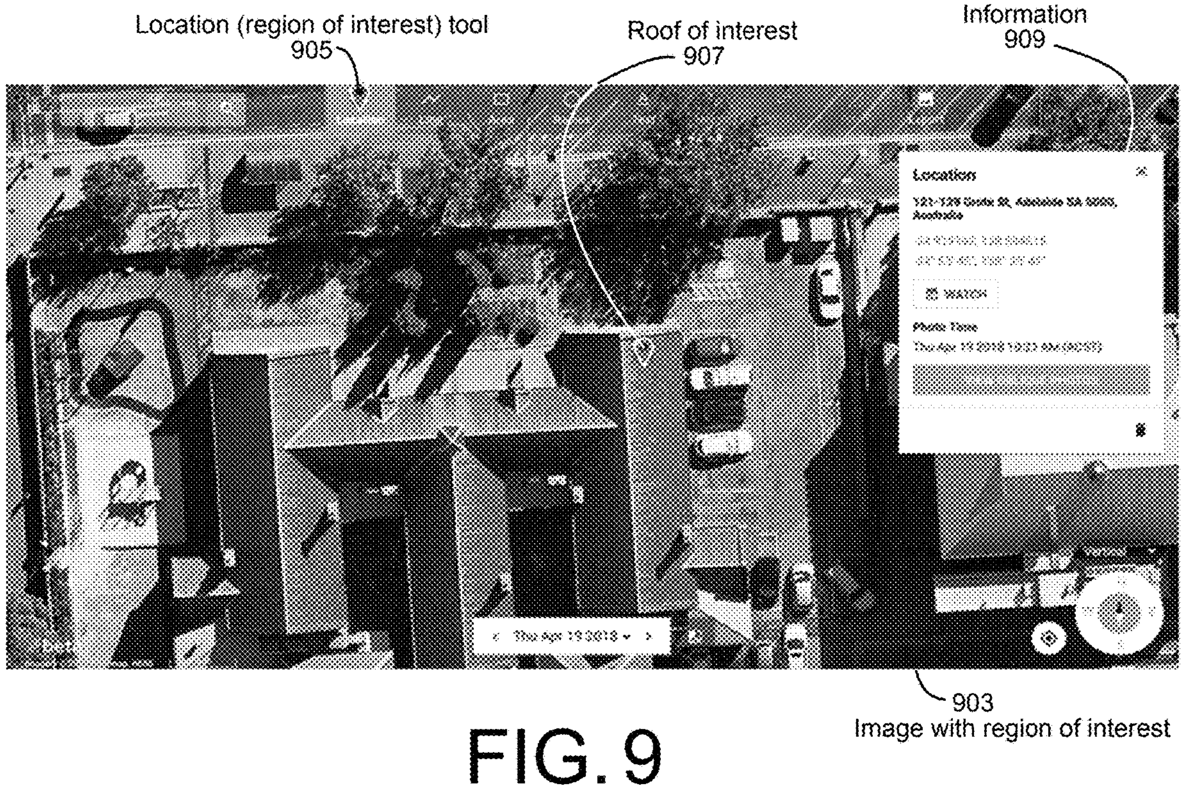
FIG. 9 shows the display on an example user interface in a step of an example application of determining the pitch of a roof using an embodiment of the invention.

FIGS. 9-13 illustrate, by displaying images, a method that includes a user selecting an initial image from an image set, the user selecting two vertices of a slope as the feature of interest on the selected initial image, and then, using the optimal image selection methods described herein to the optimal image, displaying the feature of interest as determined in the selected optimal image to for the user to correct the location of the feature in the selected optimal image, and using the user's correction to estimate one or more geometric parameters of the feature ((the feature's 3D geometry), including determining the slope between the feature's vertices:

FIG. 9 shows (as part of step 103 of FIG. 1) an image 903 that includes a roof of interest is presented on the user interface a user. The user interface includes tools including a tool for selecting a region of interest, and in this drawing, the location (region of interest) tool 905 has been selected by the user to indicate a region of interest, in this case, a roof of interest 907 on the image. When this location tool is active, information about the image is provided within an information area 909 on the right-hand side, and this area displays information, e.g., the address, timestamp if the photo, and coordinates.

Figure 10:
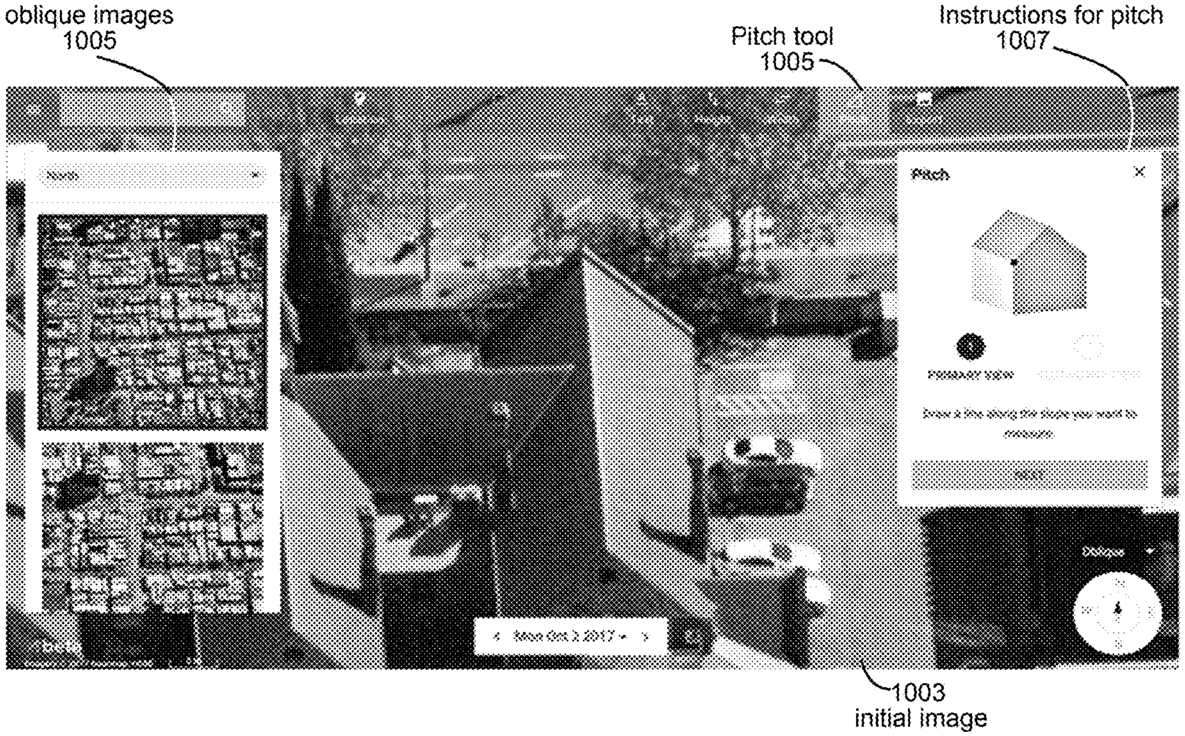
FIG. 10 shows the display on the example user interface in another step of the example application of determining the pitch of a roof using an embodiment of the invention.

FIG. 10 shows (as part of steps 105 and 107 of FIG. 1), the user's selection of an initial image 1003 as one of several oblique images that include the roof of interest of the image of FIG. 9. The user interface shows some of the oblique images are shown in an oblique images area 1005 on the left. The top of the two oblique images shown us the image selected by the user as the image of interest, i.e., the initial image 1003. The user in this drawing has selected a pitch tool 1005. So activating the pitch tool causes instructions 1007 for determining pitch to the displayed in the white region on the right shows. This region shows a generic roof on a schematic of a building, and instructs the user to "Draw a line on the slope you want to measure.".

Figure 11:
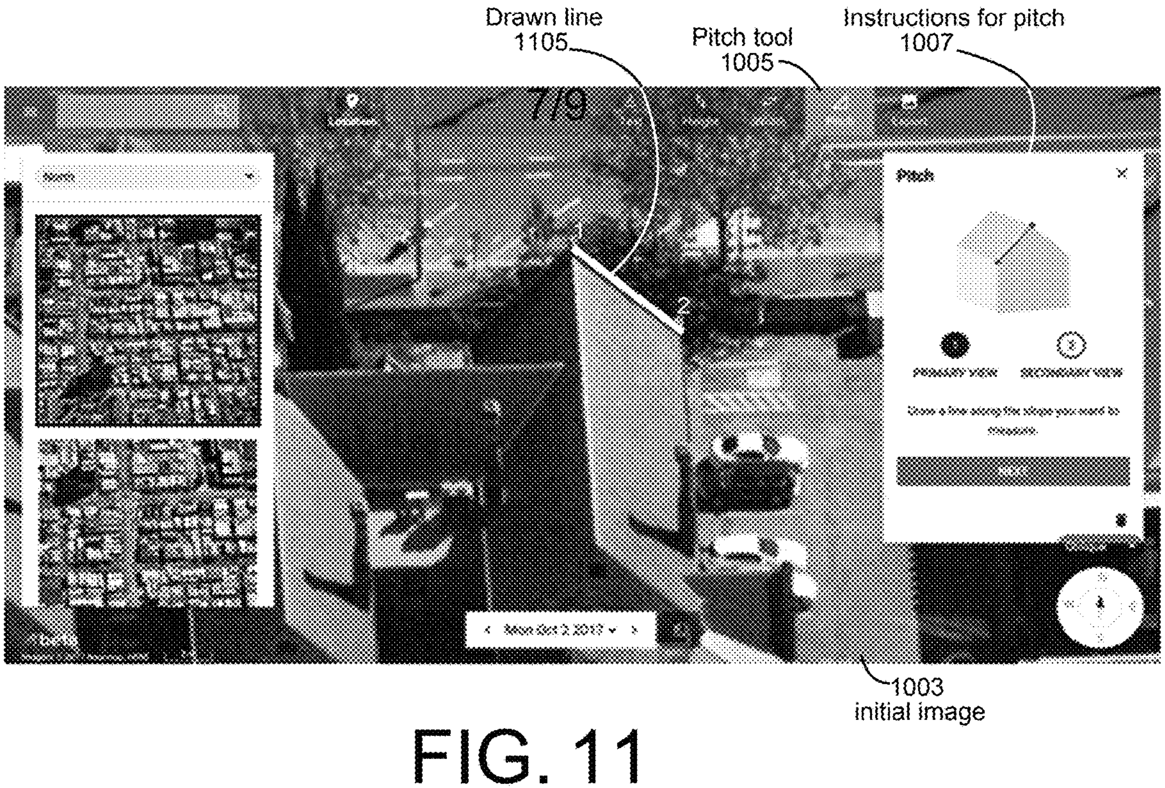
FIG. 11 shows the display on the example user interface in yet another step of the example application of determining the pitch of a roof using an embodiment of the invention.

FIG. 11 shows as part of step 107 of FIG. 1, the user drawing two vertices (points 1 & 2 in FIG. 11) representing the feature (line 1105) of interest in the initial image, which is intended to have its geometry inferred in 3D. These two points are shown in the right-hand information area on the generic roof, and "PRIMARY VIEW" is highlighted to indicate this is the initial image. The instruction "NEXT" is also provided for the user as a NEXT button to select once the user has indicated the line of an edge the roof.

Figure 12:
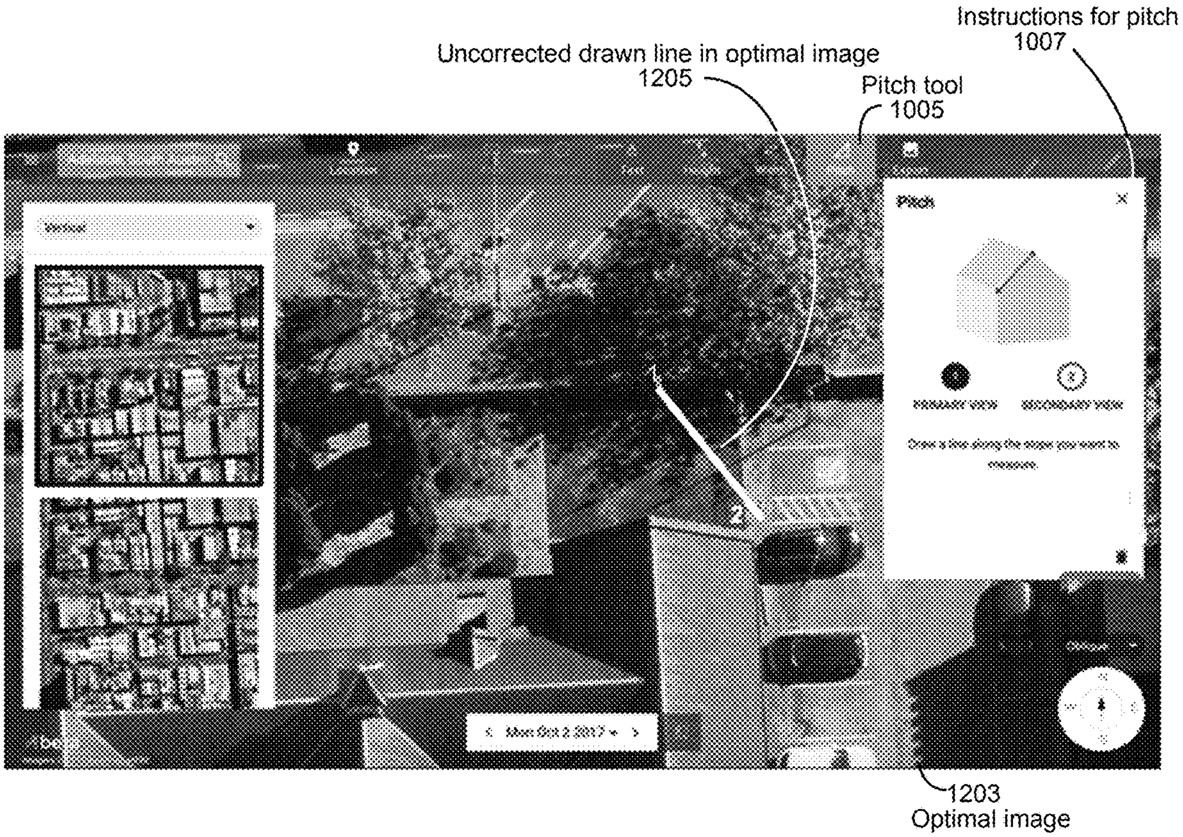
FIG. 12 shows the display on the example user interface of a further step of the example application of determining the pitch of a roof using an embodiment of the invention.

So selecting the NEXT button causes the calculations of step 109 of the flowchart of FIG. 1 to be carried out. FIG. 12 shows the display of the user interface after the user has clicked the NEXT button. Responsive to this user action, the method of above embodiment B is carried out as part of step 111 of the flowchart of FIG. 1 to automatically select and, step 113 of the flowchart of FIG. 1, display optimal image 1203 as complementary to the initial image to use with the initial image for triangulation. The location of the line selected on the initial image is determined and displayed on the optimal image as an uncorrected drawn line 1205. Note that the vertices of this line are no longer on the edge of the roof of interest on the optimal image 1203.

At this point, as part of step 1119 of the flowchart of FIG. 1, the user adjusts on the user interface the location of vertices 1 and 2 of the line feature of interest to be correctly placed in the same location as they were in the initial image, i.e., on the edge of the roof of interest. As step 121 of the flowchart of FIG. 1, the method uses the initial and optimal image to carry out triangulation and determine the true location of the vertices and hence the geometry of the line, determines the pitch and length of the line, and displays the result to the user.

Triangulation methods given two images that are complementary are well known in the art. See for example Richard I. Hartley and Peter Sturm, "Triangulation," Comput. Vis. Image Underst. Vol. 68, No. 2 (November 1997), pp. 146-157. Also, Richard Hartley and Andrew Zisserman, "Multiple View Geometry in computer vision," Cambridge University Press, 2003. Also Krzystek, P., T. Heuchek, U. Hirt, and E Petran, "A New Concept for Automatic Digital Aerial Triangulation, Proc. of Photogrammetric Week '95, pp. 215-223, 11-15 Sep. 1995, Stuttgart, Germany, 1995. In one embodiment of the invention, the "Mid-Point Method" described in Section 5.3 of the above-referenced Hartley and Sturm paper is used, The invention does not depend on which specific triangulation method is used, so long as the method requires two or more complementary images.

Figure 13:
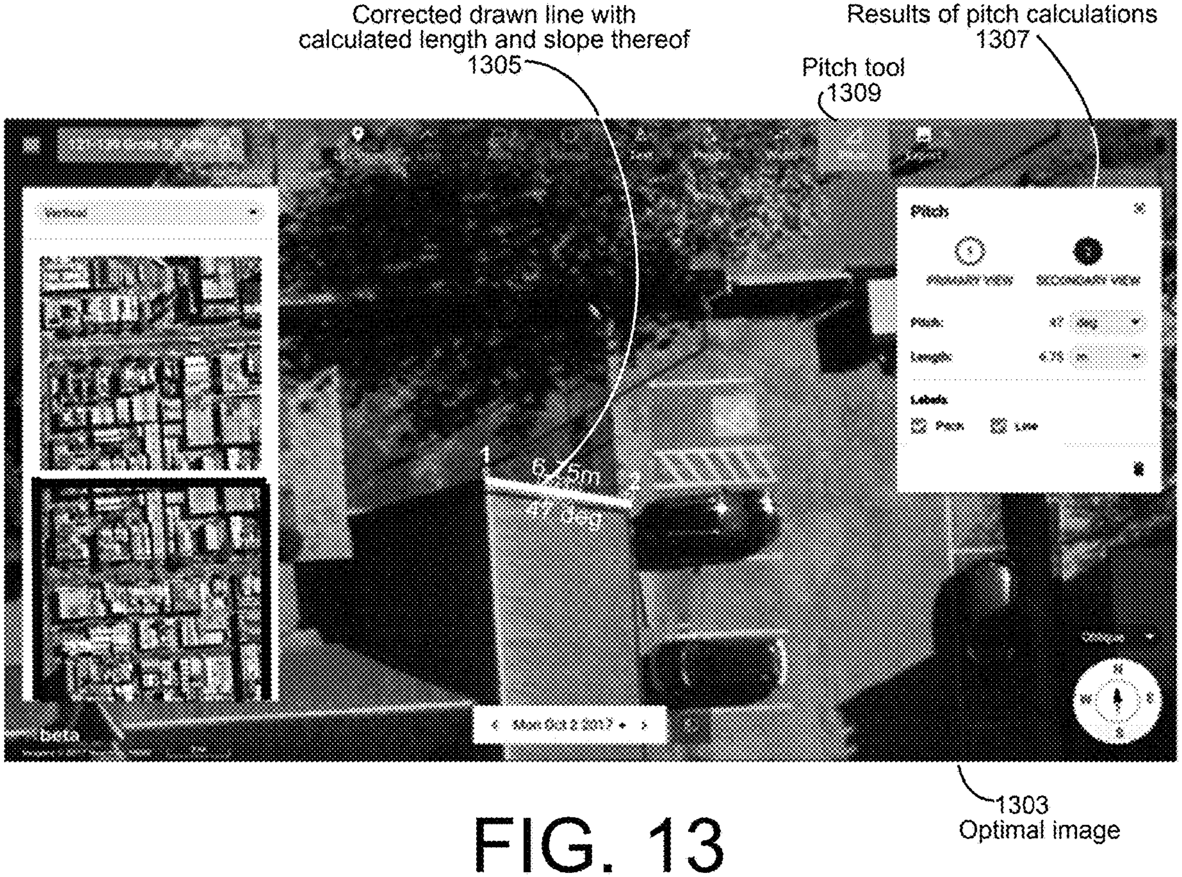
FIG. 13 shows the display on the example user interface of yet a further step of the example application of determining the pitch of a roof using an embodiment of the invention.

FIG. 13 shows the results of such action as displayed to the user. Shown on the corrected optimal image 1303 is the corrected line 1305 with the calculated length and slope thereof. The information area 1307 on the right now shows the results of the pitch calculations, in particular, the length (6.75 m) and slope (47 deg) of the line.

Note that, as described above as shown in FIG. 1, in one variation, when the optimal image is displayed, the user may select a new optimal image on which to correct placement of the selected point(s).

In yet another variation, once the optimal image is displayed to the user, the user may select to return to step 107 with the optimal image now a new initial image, and enable the method to accept from the user further points. The method then proceeds with old optimal image as the new initial image with the newly added further points.

Note that the numbering of the steps need not limit the method to carrying out the steps in a particular order. The possible different orderings would be clear to one skilled in the art from the need for specific data at each step.

General

Unless specifically stated otherwise, as apparent from the following discussions, it is appreciated that throughout the specification discussions utilizing terms such as "processing," "computing," "calculating," "determining" or the like, refer to the action and/or processes of a host device or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory.

The methodologies described herein are, in one embodiment, performable by one or more digital processors that accept machine-readable instructions, e.g., as firmware or as software, that when executed by one or more of the processors carry out at least one of the methods described herein. In such embodiments, any processor capable of executing a set of instructions (sequential or otherwise) that specify actions to be taken may be included. Thus, one example is a programmable DSP device. Another is the CPU of a microprocessor or other computer-device, or the processing part of a larger ASIC. A digital processing system may include a memory subsystem including main RAM and/or a static RAM, and/or ROM. A bus subsystem may be included for communicating between the components. The digital processing system further may be a distributed digital processing system with processors coupled wirelessly or otherwise, e.g., by a network. If the digital processing system requires a display, such a display may be included. The digital processing system in some configurations may include a sound input device, a sound output device, and a network interface device. The memory subsystem thus includes a machine-readable non-transitory medium that is coded with, i.e., has stored therein a set of instructions to cause performing, when executed by one or more digital processors, one of more of the methods described herein. Note that when the method includes several elements, e.g., several steps, no ordering of such elements is implied, unless specifically stated. The instructions may reside in the hard disk, or may also reside, completely or at least partially, within the RAM and/or other elements within the processor during execution thereof by the system. Thus, the memory and the processor also constitute the non-transitory machine-readable medium with the instructions.

Furthermore, a non-transitory machine-readable medium may form a software product. For example, it may be that the instructions to carry out some of the methods, and thus form all or some elements of the inventive system or apparatus, may be stored as firmware. A software product may be available that contains the firmware, and that may be used to "flash" the firmware.

Note that while some diagram(s) only show(s) a single processor and a single memory that stores the machine-readable instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a non-transitory machine-readable medium coded with, i.e., having stored therein a set of instructions for execution on one or more digital processors, e.g., one or more digital processors that are part of the receiver forming a pen stroke capture system.

Note that, as is understood in the art, a machine with application-specific firmware for carrying out one or more aspects of the invention becomes a special purpose machine that is modified by the firmware to carry out one or more aspects of the invention. This is different than a general purpose digital processing system using software, as the machine is especially configured to carry out the one or more aspects. Furthermore, as would be known to one skilled in the art, if the number the units to be produced justifies the cost, any set of instructions in combination with elements such as the processor may be readily converted into a special purpose ASIC or custom integrated circuit. Methodologies and software have existed for years that accept the set of instructions and particulars of, for example, the processing engine 131, and automatically or mostly automatically great a design of special-purpose hardware, e.g., generate instructions to modify a gate array or similar programmable logic, or that generate an integrated circuit to carry out the functionality previously carried out by the set of instructions. Thus, as will be appreciated by those skilled in the art, embodiments of the present invention may be embodied as a method, an apparatus such as a special purpose apparatus, an apparatus such as a data DSP device plus firmware, or a non-transitory machine-readable medium. The machine-readable carrier medium carries host device readable code including a set of instructions that when executed on one or more digital processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form a computer program product on a non-transitory machine-readable storage medium encoded with machine-executable instructions.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a host device system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Note that the claims attached to this description form part of the description, so are incorporated by reference into the description, each claim forming a different set of one or more embodiments. In jurisdictions where incorporation by reference is not permitted, the applicant reserves the right to add such claims, forming part of the specification.

What is claimed is:

1. A method, implemented by a digital processing system, for selecting complementary images from a plurality of images captured from distinct views and/or locations, each respective image captured from a respective camera having respective camera properties, the method comprising:

accepting the plurality of images, including, for each accepted image, parameters related to the geometry of the capture of the accepted image and to properties of the camera that captured the accepted image;

displaying at least one of the accepted plurality of images to a user interface of the digital processing system;

accepting input from a user to select one of the accepted images to be a user-selected initial image, the user-selected initial image being one that shows a region of interest to the user on the user interface;

accepting input from the user indicating one or more geometric features of interest within the region of interest; and for the accepted plurality of images other than the user-selected initial image, calculating one or more measures of complementarity of the accepted image to the user-selected initial image for the purpose of determining one or more 3D properties of the one or more geometric features of interest; and automatically selecting from the accepted plurality of images other than the user-selected initial image, at least one optimal image using an optimality criterion based on the one or more calculated selection measures, wherein the plurality of images being accepted are aerial images, such that the user-selected initial image is a user-selected initial aerial image and the optimal image is an optimal aerial image.

2. The method of claim 1, wherein the one or more geometric features of interest in the initial image include one of the set of features consisting of a point, a line, and a surface.

3. The method as recited in claim 2, further comprising:

displaying to the user one of the one or more optimal images, with the one or more geometric features of interest displayed.

4. The method as recited in claim 3, wherein the overall measure of complementarity includes one or more specific measures and corresponding selection criteria, and wherein the one or more specific measures include one or more of a measure of the intersection between frustums, a measure of coverage, a measure of the intersection between the frustum and an estimated extrusion or arbitrary volume, a measure of angular deviation, and a measure of resolution.

5. The method of claim 4, further comprising:

accepting from the user a correction of at least one of the one or more displayed geometric features of interest, such that the location of the correction can be used for determining one or more geometric properties of the geometric feature or features of interest; and determining one or more 3D properties of the indicated geometric feature or features.

6. The method as recited in claim 5, wherein the automatically selected at least one optimal image forms an optimal set of one or more aerial images, each image of the optimal set being complementary to the user-selected initial image for determining 3D properties of the indicated one or more geometric features and optimal according to the overall measure of complementarity, the method further comprising:

accepting from the user a selection of one of the aerial images from the optimal set other than the displayed optimal image to be a new optimal image;

displaying to the user the new optimal image, with the one or more geometric features of interest displayed on the new optimal image;

accepting from the user a correction of at least one of the one or more displayed geometric features of interest on the new optimal image, such that the location on the new optimal image of the correction can be used for determining the one or more geometric properties of the geometric feature or features of interest; and determining the one or more 3D properties of the indicated geometric feature or features.

7. The method as recited in claim 6, further comprising ranking some or all of the images in the optimal set of images according to the optimality criterion, the ranking according to suitability for use as a complementary image to the user-selected initial image, with the highest ranked image out of the optimal set of images being the optimal image.

8. The method of claim 5, wherein each of: the accepting the input from the user to select one of the accepted images; the accepting the input from the user indicating the one or more geometric features of interest; and the accepting from the user of the correction is via a graphic user interface that displays images.

9. The method of claim 5, wherein the one or more 3D properties include the slope of a roof of a building.

10. The method of claim 5, further comprising:

accepting an indication from the user of one or more new geometric features of interest, which may be the same geometric features earlier selected in the user-selected initial image, wherein the optimal image after the accepting the indication of one or more new geometric features of interest becomes a new initial image;

automatically selecting from the accepted plurality of images and using the optimality criterion a new optimal image that is complementary to the new initial image for the purpose of determining the one or more 3D properties; and displaying to the user the new optimal image, with the one or more new geometric features of interest displayed.

11. The method of claim 10, further comprising:

accepting from the user a new correction of at least one of the displayed one or more new geometric features of interest, such that the location of the new correction can be used for determining one or more geometric properties of the new geometric feature or features of interest; and determining one or more 3D properties of the indicated new geometric feature or features.

12. The method as recited in claim 1, wherein the automatically selected at least one optimal image forms an optimal set of one or more images, each image of the optimal set being complementary to the user-selected initial image for determining 3D properties of the indicated one or more geometric features and optimal according to the overall measure of complementarity.

13. The method as recited in claim 12, further comprising ranking some or all of the one or more images in the optimal set according to the optimality criterion, the ranking according to suitability for use as a complementary image to the user-selected initial image, with the highest ranked image out of the optimal set being the optimal image.

14. A digital processing system comprising:

an input port when operating accepting a plurality of aerial images captured from distinct views and/or locations, each respective aerial image having been captured from a respective camera, the accepting including accepting, for each respective accepted aerial image, respective parameters related to the geometry of the capture of the respective accepted aerial image and to properties (collectively the "camera model") of the respective camera that captured the respective accepted aerial image;

a user terminal having a display screen and a user interface that enable displaying on the display screen and that that enables a user to provide input, and otherwise interact with an image displayed on the display screen;

a digital image processing system coupled to the user terminal, the digital image processing system including one or more digital processors, and a storage subsystem that includes instructions that when executed by the digital processing system, cause the digital processing system to carry out a method of selecting complementary images from the plurality of aerial images accepted by the input port, the method comprising:

accepting the plurality of aerial images, including, for each accepted aerial image, parameters related to the geometry of the capture of the accepted aerial image and to properties of the camera that captured the accepted image;

displaying at least one of the accepted plurality of aerial images to the user interface;

accepting input from a user to select one of the accepted aerial images to be a user-selected initial image, the user-selected initial image being one that shows a region of interest to the user on the user interface;

accepting input from the user indicating one or more geometric features of interest within the region of interest;

for the accepted plurality of images other than the user-selected initial image, calculating one or more measures of complementarity of the accepted image to the user-selected initial image for the purpose of determining one or more 3D properties of the one or more geometric features of interest; and automatically selecting from the accepted plurality of images other than the user-selected initial image, at least one optimal image using an optimality criterion based on the one or more calculated selection measures.

15. The digital processing system of claim 14, wherein the one or more geometric features of interest in the initial image include one of the set of features consisting of a point, a line, and a surface.

16. The digital processing system as recited in claim 15, further comprising:

displaying to the user one of the one or more optimal aerial images, with the one or more geometric features of interest displayed.

17. The digital processing system as recited in claim 16, wherein the overall measure of complementarity includes one or more specific measures and corresponding selection criteria, and wherein the one or more specific measures include one or more of a measure of the intersection between frustums, a measure of coverage, a measure of the intersection between the frustum and an estimated extrusion or arbitrary volume, a measure of angular deviation, and a measure of resolution.

18. The digital processing system of claim 17, further comprising:

accepting from the user a correction of at least one of the one or more displayed geometric features of interest, such that the location of the correction can be used for determining one or more geometric properties of the geometric feature or features of interest; and determining one or more 3D properties of the indicated geometric feature or features.

19. The digital processing system as recited in claim 18, wherein the automatically selected at least one optimal image forms an optimal set of aerial images, each image of the optimal set being complementary to the initial image for determining 3D properties of the indicated one or more geometric features and optimal according to the overall measure of complementarity, the method further comprising:

accepting from the user a selection of one of the aerial images from the optimal set other than the displayed optimal image to be a new optimal image;

displaying to the user the new optimal image, with the one or more geometric features of interest displayed on the new optimal image;

accepting from the user a correction of at least one of the one or more displayed geometric features of interest on the new optimal image, such that the location on the new optimal image of the correction can be used for determining the one or more geometric properties of the geometric feature or features of interest; and determining the one or more 3D properties of the indicated geometric feature or features.

20. The digital processing system as recited in claim 19, further comprising ranking some or all of the images in the optimal set of images according to the optimality criterion, the ranking according to suitability for use as a complementary image to the user-selected initial image, with the highest ranked image out of the optimal set of images being the optimal image.

21. The digital processing system of claim 18, wherein each of: the accepting the input from the user to select one of the accepted images; the accepting the input from the user indicating the one or more geometric features of interest; and the accepting from the user of the correction is via a graphic user interface that displays images.

22. The digital processing system of claim 18, wherein the one or more 3D properties include the slope of a roof of a building.

23. The digital processing system of claim 18, further comprising:

accepting an indication from the user of one or more new geometric features of interest, which may be the same geometric features earlier selected in the user-selected initial image, wherein the optimal image after the accepting the indication of one or more new geometric features of interest becomes a new initial image;

automatically selecting from the accepted plurality of images and using the optimality criterion a new optimal image that is complementary to the new initial image for the purpose of determining the one or more 3D properties; and displaying to the user the new optimal image, with the one or more new geometric features of interest displayed.

24. The digital processing system of claim 23, further comprising:

accepting from the user a new correction of at least one of the displayed one or more new geometric features of interest, such that the location of the new correction can be used for determining one or more geometric properties of the new geometric feature or features of interest; and determining one or more 3D properties of the indicated new geometric feature or features.

25. The digital processing system as recited in claim 14, wherein the automatically selected at least one aerial image forms an optimal set of one or more aerial images, each aerial image of the optimal set of aerial images being complementary to the user-selected initial aerial image for determining 3D properties of the indicated one or more geometric features and optimal according to the overall measure of complementarity.

26. The digital processing system as recited in claim 25, further comprising ranking some or all of the one or more images in the optimal set according to the optimality criterion, the ranking according to suitability for use as a complementary image to the user-selected initial image, with the highest ranked image out of the optimal set of aerial images being the optimal aerial image.

27. A non-transitory machine-readable medium comprising instructions that when executed on one or more digital processors of a digital processing systems cause carrying out a method a method of selecting complementary images from a plurality of images captured from distinct views and/or locations, each respective image captured from a respective camera having respective camera properties, the method comprising:

accepting the plurality of images, including, for each accepted image, parameters related to the geometry of capture of the accepted image and to properties of the camera that captured the accepted image;

displaying at least one of the accepted plurality of images to a user interface of the digital processing system;

accepting input from a user to select one of the accepted images to be a user-selected initial image, the user-selected initial image being one that shows a region of interest to the user on the user interface;

accepting input from the user indicating one or more geometric features of interest within the region of interest; and calculating one or more selection measures for the accepted plurality of images, which excludes the user-selected initial image, wherein the selection measures for each accepted image are measures of complementarity of the accepted image to the user-selected initial image for the purpose of determining one or more 3D properties of the one or more geometric features of interest; and automatically selecting from the accepted plurality of images, which excludes the user-selected initial image, at least one optimal image using an optimality criterion that is an overall measure of complementarity based on the one or more calculated selection measures, wherein the plurality images being accepted are aerial images, such that the user-selected initial image is a user-selected initial aerial image and the optimal image is an optimal aerial image.

28. The non-transitory machine-readable medium as recited in claim 27, wherein the automatically selected at least one optimal image forms an optimal set of one or more aerial images, each aerial image of the optimal set of aerial images being complementary to the user-selected initial aerial image for determining 3D properties of the indicated one or more geometric features.

29. The non-transitory machine-readable medium as recited in claim 28, wherein the method further comprises ranking some or all of the one or more images in the optimal set of aerial images according to the optimality criterion, the ranking according to suitability for use as a complementary image to the user-selected initial image, with the highest ranked image out of the optimal set of aerial images being the optimal aerial image.

30. The non-transitory machine-readable medium of claim 27, wherein the one or more geometric features of interest in the initial image include one of the set of features consisting of a point, a line, and a surface.

31. The non-transitory machine-readable medium as recited in claim 30, wherein the method further comprises:

displaying to the user one of the one or more the optimal aerial images, with the one or more geometric features of interest displayed.

32. The non-transitory machine-readable medium as recited in claim 31, wherein the overall measure of complementarity includes one or more specific measures and corresponding selection criteria, and wherein the one or more specific measures include one or more of a measure of the intersection between frustums, a measure of coverage, a measure of the intersection between the frustum and an estimated extrusion or arbitrary volume, a measure of angular deviation, and a measure of resolution.

33. The non-transitory machine-readable medium of claim 31, wherein the method further comprises:

accepting from the user a correction of at least one of the one or more displayed geometric features of interest, such that the location of the correction can be used for determining one or more geometric properties of the geometric feature or features of interest; and determining one or more 3D properties of the indicated geometric feature or features.

34. The non-transitory machine-readable medium as recited in claim 33, wherein the automatically selected at least one optimal image forms an optimal set of one or more aerial images, each image of the optimal set being complementary to the user-selected initial image for determining 3D properties of the indicated one or more geometric features, the method further comprising:

accepting from the user a selection of one of the aerial images from the optimal set other than the displayed optimal image to be a new optimal image;

displaying to the user the new optimal image, with the one or more geometric features of interest displayed on the new optimal image;

accepting from the user a correction of at least one of the one or more displayed geometric features of interest on the new optimal image, such that the location on the new optimal image of the correction can be used for determining the one or more geometric properties of the geometric feature or features of interest; and determining the one or more 3D properties of the indicated geometric feature or features.

35. The non-transitory machine-readable medium as recited in claim 34, wherein the method further comprises ranking some or all of the images in the optimal set of images according to the optimality criterion, the ranking according to suitability for use as a complementary image to the user-selected initial image, with the highest ranked image out of the optimal set of images being the optimal image.

36. The non-transitory machine-readable medium of claim 33, wherein each of: the accepting the input from a user to select one of the accepted images; the accepting the input from the user indicating the one or more geometric features of interest; and the accepting from the user of the correction is via a graphic user interface that displays images.

37. The non-transitory machine-readable medium of claim 33, wherein the one or more 3D properties include the slope of a roof of a building.

38. The non-transitory machine-readable medium of claim 33, wherein the method further comprises:

accepting an indication from the user of one or more new geometric features of interest, which may be the same geometric features earlier selected in the user-selected initial image, wherein the optimal image after the accepting the indication of one or more new geometric features of interest becomes a new initial image;

automatically selecting from the accepted plurality of images and using the optimality criterion a new optimal image that is complementary to the new initial image for the purpose of determining the one or more 3D properties; and displaying to the user the new optimal image, with the one or more new geometric features of interest displayed.

39. The non-transitory machine-readable medium of claim 38, wherein the method further comprises:

accepting from the user a new correction of at least one of the displayed one or more new geometric features of interest, such that the location of the new correction can be used for determining one or more geometric properties of the new geometric feature or features of interest; and determining one or more 3D properties of the indicated new geometric feature or features.

* * * * *